United States Patent
Sachdev et al.

(10) Patent No.: US 9,301,191 B2
(45) Date of Patent: Mar. 29, 2016

(54) QUALITY OF SERVICE TO OVER THE TOP APPLICATIONS USED WITH VPN

(71) Applicant: TeleCommunication Systems, Inc., Annapolis, MD (US)

(72) Inventors: Vineet Sachdev, Annapolis, MD (US); Keith McFarland, Annapolis, MD (US); John L. Griffin, Boston, MA (US)

(73) Assignee: TeleCommunication Systems, Inc., Annapolis, MD (US)

( * ) Notice: Subject to any disclaimer, the term of this patent is extended or adjusted under 35 U.S.C. 154(b) by 34 days.

(21) Appl. No.: 14/056,412

(22) Filed: Oct. 17, 2013

(65) Prior Publication Data

US 2015/0085664 A1 Mar. 26, 2015

Related U.S. Application Data

(63) Continuation-in-part of application No. 14/032,913, filed on Sep. 20, 2013.

(51) Int. Cl.
*H04W 28/02* (2009.01)
*H04W 76/02* (2009.01)
(Continued)

(52) U.S. Cl.
CPC ....... *H04W 28/0215* (2013.01); *H04L 41/5019* (2013.01); *H04L 47/2475* (2013.01); *H04W 4/00* (2013.01); *H04W 76/022* (2013.01); *H04W 8/18* (2013.01); *H04W 28/24* (2013.01)

(58) Field of Classification Search
CPC ........... H04W 28/0215; H04W 76/022; H04L 47/2475
See application file for complete search history.

(56) References Cited

U.S. PATENT DOCUMENTS

| 1,103,073 A | 7/1914 | O'Connell |
| 4,445,118 A | 4/1984 | Taylor et al. |

(Continued)

FOREIGN PATENT DOCUMENTS

| WO | 98/01887 | 10/1998 |
| WO | 9928848 | 12/1999 |

(Continued)

OTHER PUBLICATIONS

Intrado Inc., Qwest Detailed SR/ALI to MPC/GMLC Interface Specification for TCP/IP Implementation of TIA/EIA/J-STD-036 E2 with Phase I Location Description Addition, Intrado Informed Response; Apr. 2004; Issue 1.11; pp. 1-57.

(Continued)

*Primary Examiner* — Curtis A Alia
(74) *Attorney, Agent, or Firm* — William H. Bollman

(57) ABSTRACT

Conventional quality of service (QoS) treatment is extended to over-the-top (OTT) applications transmitting data over a commercial wireless network via a virtual private network (VPN) tunnel. An over-the-top (OTT) application server and a VPN client/server routing data to/from that OTT application server via a VPN tunnel, are integrated with a quality of service (QoS) server to enable the OTT application server and/or VPN client/server to request and get desired QoS treatment for application data routed by the OTT application server over the VPN tunnel. The QoS server forwards QoS rules received in a QoS request message to a policy and charging rules function (PCRF) on the OTT application/VPN client devices' home mobile network operator (MNO). If the client device is roaming, the PCRF on the home MNO forwards QoS rules to a PCRF on a serving MNO. QoS treatment is then carried out by the PCRF in a conventional manner.

45 Claims, 7 Drawing Sheets

(51) Int. Cl.
  *H04L 12/859* (2013.01)
  *H04L 12/24* (2006.01)
  *H04W 4/00* (2009.01)
  *H04W 8/18* (2009.01)
  *H04W 28/24* (2009.01)

(56) References Cited

U.S. PATENT DOCUMENTS

| | | |
|---|---|---|
| 4,494,119 A | 1/1985 | Wimbush |
| 4,651,156 A | 3/1987 | Martinez |
| 4,706,275 A | 11/1987 | Kamil |
| 4,891,638 A | 1/1990 | Davis |
| 4,891,650 A | 1/1990 | Sheffer |
| 4,910,767 A | 3/1990 | Brugliera et al. |
| 4,952,928 A | 8/1990 | Carroll |
| 4,972,484 A | 11/1990 | Theile |
| 5,014,206 A | 5/1991 | Scribner |
| 5,043,736 A | 8/1991 | Darnell |
| 5,055,851 A | 10/1991 | Sheffer |
| 5,068,656 A | 11/1991 | Sutherland |
| 5,068,891 A | 11/1991 | Marshall |
| 5,070,329 A | 12/1991 | Jasimaki |
| 5,081,667 A | 1/1992 | Drori |
| 5,119,104 A | 6/1992 | Heller |
| 5,126,722 A | 6/1992 | Kamis |
| 5,144,283 A | 9/1992 | Arens |
| 5,161,180 A | 11/1992 | Chavous |
| 5,166,972 A | 11/1992 | Smith |
| 5,177,478 A | 1/1993 | Wagai |
| 5,193,215 A | 3/1993 | Olmer |
| 5,208,756 A | 5/1993 | Song |
| 5,214,789 A | 5/1993 | George |
| 5,218,367 A | 6/1993 | Sheffer |
| 5,223,844 A | 6/1993 | Mansell |
| 5,239,570 A | 8/1993 | Koster |
| 5,265,630 A | 11/1993 | Hartmann |
| 5,266,944 A | 11/1993 | Carroll |
| 5,283,570 A | 2/1994 | DeLuca |
| 5,289,527 A | 2/1994 | Tiedemann |
| 5,293,642 A | 3/1994 | Lo |
| 5,299,132 A | 3/1994 | Wortham |
| 5,301,354 A | 4/1994 | Schwendeman |
| 5,311,516 A | 5/1994 | Kuznicki |
| 5,325,302 A | 6/1994 | Izidon |
| 5,327,529 A | 7/1994 | Fults |
| 5,334,974 A | 8/1994 | Simms |
| 5,335,246 A | 8/1994 | Yokev |
| 5,343,493 A | 8/1994 | Karimulah |
| 5,347,568 A | 9/1994 | Moody |
| 5,351,235 A | 9/1994 | Lahtinen |
| 5,361,212 A | 11/1994 | Class |
| 5,363,425 A | 11/1994 | Mufti |
| 5,365,451 A | 11/1994 | Wang |
| 5,374,936 A | 12/1994 | Feng |
| 5,379,344 A | 1/1995 | Larsson |
| 5,379,451 A | 1/1995 | Nakagoshi |
| 5,381,338 A | 1/1995 | Wysocki |
| 5,387,993 A | 2/1995 | Heller |
| 5,388,147 A | 2/1995 | Grimes |
| 5,390,339 A | 2/1995 | Bruckery |
| 5,394,158 A | 2/1995 | Chia |
| 5,396,227 A | 3/1995 | Carroll |
| 5,398,190 A | 3/1995 | Wortham |
| 5,406,614 A | 4/1995 | Hara |
| 5,418,537 A | 5/1995 | Bird |
| 5,422,813 A | 6/1995 | Schuchman |
| 5,423,076 A | 6/1995 | Westergren |
| 5,432,841 A | 7/1995 | Rimer |
| 5,434,789 A | 7/1995 | Fraker |
| 5,454,024 A | 9/1995 | Lebowitz |
| 5,457,746 A | 10/1995 | Dolphin |
| 5,461,390 A | 10/1995 | Hosher |
| 5,470,233 A | 11/1995 | Fruchterman |
| 5,479,408 A | 12/1995 | Will |
| 5,479,482 A | 12/1995 | Grimes |
| 5,485,161 A | 1/1996 | Vaugh |
| 5,485,163 A | 1/1996 | Singer |
| 5,488,563 A | 1/1996 | Chazelle |
| 5,494,091 A | 2/1996 | Freeman |
| 5,497,149 A | 3/1996 | Fast |
| 5,506,886 A | 4/1996 | Maine |
| 5,508,931 A | 4/1996 | Snider |
| 5,513,243 A | 4/1996 | Kage |
| 5,515,287 A | 5/1996 | Hakoyama |
| 5,517,199 A | 5/1996 | DiMattei |
| 5,519,403 A | 5/1996 | Bickley |
| 5,530,655 A | 6/1996 | Lokhoff |
| 5,530,914 A | 6/1996 | McPheters |
| 5,532,690 A | 7/1996 | Hertel |
| 5,535,434 A | 7/1996 | Siddoway |
| 5,539,395 A | 7/1996 | Buss |
| 5,539,398 A | 7/1996 | Hall |
| 5,539,829 A | 7/1996 | Lokhoff |
| 5,543,776 A | 8/1996 | L'Esperance |
| 5,546,445 A | 8/1996 | Dennison |
| 5,552,772 A | 9/1996 | Janky |
| 5,555,286 A | 9/1996 | Tendler |
| 5,568,119 A | 10/1996 | Schipper |
| 5,568,153 A | 10/1996 | Beliveau |
| 5,568,551 A | 10/1996 | Kawashima |
| 5,574,648 A | 11/1996 | Pilley |
| 5,579,372 A | 11/1996 | Angstrom |
| 5,588,009 A | 12/1996 | Will |
| 5,592,535 A | 1/1997 | Klotz |
| 5,594,780 A | 1/1997 | Wiedeman |
| 5,604,486 A | 2/1997 | Lauro |
| 5,606,313 A | 2/1997 | Allen |
| 5,606,618 A | 2/1997 | Lokhoff |
| 5,606,850 A | 3/1997 | Nakamura |
| 5,610,815 A | 3/1997 | Gudat |
| 5,614,890 A | 3/1997 | Fox |
| 5,615,116 A | 3/1997 | Gudat |
| 5,621,793 A | 4/1997 | Bednarek |
| 5,628,051 A | 5/1997 | Salin |
| 5,629,693 A | 5/1997 | Janky |
| 5,633,912 A | 5/1997 | Tsoi |
| 5,636,276 A | 6/1997 | Brugger |
| 5,661,652 A | 8/1997 | Sprague |
| 5,661,755 A | 8/1997 | Van De Kerkhof |
| 5,682,600 A | 10/1997 | Salin |
| 5,689,245 A | 11/1997 | Noreen |
| 5,699,053 A | 12/1997 | Jonsson |
| 5,704,029 A | 12/1997 | Wright, Jr. |
| 5,721,781 A | 2/1998 | Deo |
| 5,731,785 A | 3/1998 | Lemelson |
| 5,740,534 A | 4/1998 | Ayerst |
| 5,761,618 A | 6/1998 | Lynch |
| 5,765,152 A | 6/1998 | Erickson |
| 5,767,795 A | 6/1998 | Schaphorst |
| 5,768,509 A | 6/1998 | Gunluk |
| 5,771,353 A | 6/1998 | Eggleston |
| 5,774,533 A | 6/1998 | Patel |
| 5,774,670 A | 6/1998 | Montulli |
| 5,787,357 A | 7/1998 | Salin |
| 5,794,142 A | 8/1998 | Vanttila |
| 5,797,094 A | 8/1998 | Houde |
| 5,797,096 A | 8/1998 | Lupien |
| 5,802,492 A | 9/1998 | DeLorrme |
| 5,806,000 A | 9/1998 | Vo |
| 5,809,415 A | 9/1998 | Rossmann |
| 5,812,086 A | 9/1998 | Bertiger |
| 5,812,087 A | 9/1998 | Krasner |
| 5,822,700 A | 10/1998 | Hult |
| 5,828,740 A | 10/1998 | Khue |
| 5,835,907 A | 11/1998 | Newman |
| 5,841,396 A | 11/1998 | Krasner |
| 5,857,201 A | 1/1999 | Wright, Jr. |
| 5,864,667 A | 1/1999 | Barkam |
| 5,874,914 A | 2/1999 | Krasner |
| 5,896,369 A | 4/1999 | Warsta |
| 5,920,821 A | 7/1999 | Seazholtz |
| 5,922,074 A | 7/1999 | Richard |
| 5,930,250 A | 7/1999 | Klok |
| 5,930,701 A | 7/1999 | Skog |

(56) References Cited

U.S. PATENT DOCUMENTS

| | | |
|---|---|---|
| 5,943,399 A | 8/1999 | Banister |
| 5,945,944 A | 8/1999 | Krasner |
| 5,946,629 A | 8/1999 | Sawyer |
| 5,946,630 A | 8/1999 | Willars |
| 5,950,130 A | 9/1999 | Coursey |
| 5,950,137 A | 9/1999 | Kim |
| 5,953,398 A | 9/1999 | Hill |
| 5,960,362 A | 9/1999 | Grob |
| 5,974,054 A | 10/1999 | Couts |
| 5,978,685 A | 11/1999 | Laiho |
| 5,983,099 A | 11/1999 | Yao |
| 5,987,323 A | 11/1999 | Huotari |
| 5,998,111 A | 12/1999 | Abe |
| 5,999,124 A | 12/1999 | Sheynblat |
| 6,014,602 A | 1/2000 | Kithol |
| 6,032,051 A | 2/2000 | Hall |
| 6,035,025 A | 3/2000 | Hanson |
| 6,049,710 A | 4/2000 | Nilsson |
| 6,052,081 A | 4/2000 | Krasner |
| 6,058,300 A | 5/2000 | Hanson |
| 6,058,338 A | 5/2000 | Agashe et al. |
| 6,061,018 A | 5/2000 | Sheynblat |
| 6,061,346 A | 5/2000 | Nordman |
| 6,064,336 A | 5/2000 | Krasner |
| 6,064,875 A | 5/2000 | Morgan |
| 6,067,045 A | 5/2000 | Castelloe |
| 6,070,067 A | 5/2000 | Nguyen |
| 6,075,982 A | 6/2000 | Donovan |
| 6,081,229 A | 6/2000 | Soliman |
| 6,081,508 A | 6/2000 | West |
| 6,085,320 A | 7/2000 | Kaliski, Jr. |
| 6,101,378 A | 8/2000 | Barabush |
| 6,104,931 A | 8/2000 | Havinis |
| 6,108,533 A | 8/2000 | Brohoff |
| 6,122,503 A | 9/2000 | Daly |
| 6,122,520 A | 9/2000 | Want |
| 6,124,810 A | 9/2000 | Segal |
| 6,131,028 A | 10/2000 | Whittington |
| 6,131,067 A | 10/2000 | Girerd |
| 6,133,874 A | 10/2000 | Krasner |
| 6,134,483 A | 10/2000 | Vayanos |
| 6,138,003 A | 10/2000 | Kingdon |
| 6,148,197 A | 11/2000 | Bridges |
| 6,148,198 A | 11/2000 | Anderson |
| 6,148,342 A | 11/2000 | Ho |
| 6,149,353 A | 11/2000 | Nilsson |
| 6,150,980 A | 11/2000 | Krasner |
| 6,154,172 A | 11/2000 | Piccionelli |
| 6,169,891 B1 | 1/2001 | Gorham |
| 6,169,901 B1 | 1/2001 | Boucher |
| 6,169,902 B1 | 1/2001 | Kawamoto |
| 6,173,181 B1 | 1/2001 | Losh |
| 6,178,505 B1 | 1/2001 | Schneider |
| 6,178,506 B1 | 1/2001 | Quick, Jr. |
| 6,181,935 B1 | 1/2001 | Gossman |
| 6,188,354 B1 | 2/2001 | Soliman |
| 6,188,752 B1 | 2/2001 | Lesley |
| 6,188,909 B1 | 2/2001 | Alananra |
| 6,189,098 B1 | 2/2001 | Kaliski, Jr. |
| 6,195,557 B1 | 2/2001 | Havinis |
| 6,198,431 B1 | 3/2001 | Gibson |
| 6,199,045 B1 | 3/2001 | Giniger |
| 6,199,113 B1 | 3/2001 | Alegre |
| 6,205,330 B1 | 3/2001 | Winbladh |
| 6,208,290 B1 | 3/2001 | Krasner |
| 6,208,854 B1 | 3/2001 | Roberts |
| 6,215,441 B1 | 4/2001 | Moeglein |
| 6,219,557 B1 | 4/2001 | Havinis |
| 6,223,046 B1 | 4/2001 | Hamill-Keays |
| 6,226,529 B1 | 5/2001 | Bruno |
| 6,239,742 B1 | 5/2001 | Krasner |
| 6,247,135 B1 | 6/2001 | Feaugue |
| 6,249,680 B1 | 6/2001 | Wax |
| 6,249,744 B1 | 6/2001 | Morita |
| 6,249,873 B1 | 6/2001 | Richard |
| 6,253,203 B1 | 6/2001 | O'Flaherty |
| 6,260,147 B1 | 7/2001 | Quick, Jr. |
| 6,266,614 B1 | 7/2001 | Alumbaugh |
| 6,275,692 B1 | 8/2001 | Skog |
| 6,275,849 B1 | 8/2001 | Ludwig |
| 6,278,701 B1 | 8/2001 | Ayyagari |
| 6,289,373 B1 | 9/2001 | Dezonno |
| 6,297,768 B1 | 10/2001 | Allen, Jr. |
| 6,307,504 B1 | 10/2001 | Sheynblat |
| 6,308,269 B2 | 10/2001 | Proidl |
| 6,313,786 B1 | 11/2001 | Sheynblat |
| 6,317,594 B1 | 11/2001 | Gossman |
| 6,321,091 B1 | 11/2001 | Holland |
| 6,321,092 B1 | 11/2001 | Fitch |
| 6,321,257 B1 | 11/2001 | Kotala |
| 6,324,524 B1 | 11/2001 | Lent |
| 6,327,473 B1 | 12/2001 | Soliman |
| 6,327,479 B1 | 12/2001 | Mikkola |
| 6,330,454 B1 | 12/2001 | Verdonk |
| 6,333,919 B2 | 12/2001 | Gaffney |
| 6,360,093 B1 | 3/2002 | Ross |
| 6,360,102 B1 | 3/2002 | Havinis |
| 6,363,254 B1 | 3/2002 | Jones |
| 6,367,019 B1 | 4/2002 | Ansell |
| 6,370,389 B1 | 4/2002 | Isomursu |
| 6,377,209 B1 | 4/2002 | Krasner |
| 6,400,314 B1 | 6/2002 | Krasner |
| 6,400,958 B1 | 6/2002 | Isomursu |
| 6,411,254 B1 | 6/2002 | Moeglein |
| 6,421,002 B2 | 7/2002 | Krasner |
| 6,427,001 B1 | 7/2002 | Contractor |
| 6,433,734 B1 | 8/2002 | Krasner |
| 6,434,381 B1 | 8/2002 | Moore |
| 6,442,391 B1 | 8/2002 | Johansson |
| 6,449,473 B1 | 9/2002 | Raivisto |
| 6,449,476 B1 | 9/2002 | Hutchinson, IV |
| 6,456,852 B2 | 9/2002 | Bar |
| 6,463,272 B1 | 10/2002 | Wallace |
| 6,477,150 B1 | 11/2002 | Maggenti |
| 6,504,491 B1 | 1/2003 | Christians |
| 6,505,049 B1 | 1/2003 | Dorenbosch |
| 6,510,387 B2 | 1/2003 | Fuchs |
| 6,512,922 B1 | 1/2003 | Burg |
| 6,512,930 B2 | 1/2003 | Sandegren |
| 6,515,623 B2 | 2/2003 | Johnson |
| 6,519,466 B2 | 2/2003 | Pande |
| 6,522,682 B1 | 2/2003 | Kohli |
| 6,526,026 B1 | 2/2003 | Menon |
| 6,529,500 B1 | 3/2003 | Pandharipande |
| 6,529,829 B2 | 3/2003 | Turetzky |
| 6,531,982 B1 | 3/2003 | White |
| 6,538,757 B1 | 3/2003 | Sansone |
| 6,539,200 B1 | 3/2003 | Schiff |
| 6,539,232 B2 | 3/2003 | Hendrey et al. |
| 6,539,304 B1 | 3/2003 | Chansarkar |
| 6,542,464 B1 | 4/2003 | Takeda |
| 6,542,734 B1 | 4/2003 | Abrol |
| 6,542,743 B1 | 4/2003 | Soliman |
| 6,549,776 B1 | 4/2003 | Joong |
| 6,549,844 B1 | 4/2003 | Egberts |
| 6,553,236 B1 | 4/2003 | Dunko |
| 6,556,832 B1 | 4/2003 | Soliman |
| 6,560,456 B1 | 5/2003 | Lohtia |
| 6,560,461 B1 | 5/2003 | fomukong |
| 6,560,534 B2 | 5/2003 | Abraham |
| 6,564,261 B1 | 5/2003 | Gudjonsson |
| 6,570,530 B2 | 5/2003 | Gaal |
| 6,571,095 B1 | 5/2003 | Koodli |
| 6,574,558 B2 | 6/2003 | Kohli |
| 6,580,390 B1 | 6/2003 | Hay |
| 6,584,552 B1 | 6/2003 | Kuno |
| 6,587,691 B1 | 7/2003 | Granstam |
| 6,594,500 B2 | 7/2003 | Bender |
| 6,597,311 B2 | 7/2003 | Sheynblat |
| 6,600,927 B2 | 7/2003 | Hamilton |
| 6,603,973 B1 | 8/2003 | Foladare |
| 6,606,495 B1 | 8/2003 | Korpi |
| 6,606,554 B2 | 8/2003 | Edge |
| 6,609,004 B1 | 8/2003 | Morse |

(56) References Cited

U.S. PATENT DOCUMENTS

| | | |
|---|---|---|
| 6,611,757 B2 | 8/2003 | Brodie |
| 6,618,593 B1 | 9/2003 | Drutman |
| 6,618,670 B1 | 9/2003 | Chansarkar |
| 6,621,452 B2 | 9/2003 | Knockeart |
| 6,621,810 B1 | 9/2003 | Leung |
| 6,628,233 B2 | 9/2003 | Knockeart |
| 6,633,255 B2 | 10/2003 | Krasner |
| 6,640,184 B1 | 10/2003 | Rabe |
| 6,650,288 B1 | 11/2003 | Pitt |
| 6,661,372 B1 | 12/2003 | Girerd |
| 6,665,539 B2 | 12/2003 | Sih |
| 6,665,541 B1 | 12/2003 | Krasner |
| 6,671,620 B1 | 12/2003 | Garin |
| 6,677,894 B2 | 1/2004 | Sheynblat |
| 6,680,694 B1 | 1/2004 | Knockheart |
| 6,680,695 B2 | 1/2004 | Turetzky |
| 6,687,504 B1 | 2/2004 | Raith |
| 6,691,019 B2 | 2/2004 | Seeley |
| 6,694,258 B2 | 2/2004 | Johnson |
| 6,697,629 B1 | 2/2004 | Grilli |
| 6,698,195 B1 | 3/2004 | Hellinger |
| 6,701,144 B2 | 3/2004 | Kirbas |
| 6,703,971 B2 | 3/2004 | Pande |
| 6,703,972 B2 | 3/2004 | Van Diggelen |
| 6,704,651 B2 | 3/2004 | Van Diggelen |
| 6,707,421 B1 | 3/2004 | Drury |
| 6,714,793 B1 | 3/2004 | Carey |
| 6,718,174 B2 | 4/2004 | Vayanos |
| 6,720,915 B2 | 4/2004 | Sheynblat |
| 6,721,578 B2 | 4/2004 | Minear |
| 6,721,871 B2 | 4/2004 | Piispanen |
| 6,724,342 B2 | 4/2004 | Bloebaum |
| 6,725,159 B2 | 4/2004 | Krasner |
| 6,728,701 B1 | 4/2004 | Stoica |
| 6,731,940 B1 | 5/2004 | Nagendran |
| 6,734,821 B2 | 5/2004 | Van Diggelen |
| 6,738,013 B2 | 5/2004 | Orler |
| 6,738,800 B1 | 5/2004 | Aquilon |
| 6,741,842 B2 | 5/2004 | Goldberg |
| 6,744,856 B2 | 6/2004 | Karnik |
| 6,744,858 B1 | 6/2004 | Ryan |
| 6,745,038 B2 | 6/2004 | Callaway, Jr. |
| 6,747,596 B2 | 6/2004 | Orler |
| 6,748,195 B1 | 6/2004 | Phillips |
| 6,751,464 B1 | 6/2004 | Burg |
| 6,756,938 B2 | 6/2004 | Zhao |
| 6,757,544 B2 | 6/2004 | Rangarajan |
| 6,757,545 B2 | 6/2004 | Nowak |
| 6,757,828 B1 | 6/2004 | Jaffe |
| 6,771,742 B2 | 8/2004 | McCalmont |
| 6,771,971 B2 | 8/2004 | Smith |
| 6,772,340 B1 | 8/2004 | Peinado |
| 6,775,255 B1 | 8/2004 | Roy |
| 6,775,267 B1 | 8/2004 | Kung |
| 6,775,534 B2 | 8/2004 | Lindgren |
| 6,775,655 B1 | 8/2004 | Peinado |
| 6,775,802 B2 | 8/2004 | Gaal |
| 6,778,136 B2 | 8/2004 | Gronemeyer |
| 6,778,885 B2 | 8/2004 | Agashe |
| 6,781,963 B2 | 8/2004 | Crockett |
| 6,788,249 B1 | 9/2004 | Farmer |
| 6,795,444 B1 | 9/2004 | Vo |
| 6,795,699 B1 | 9/2004 | McGraw |
| 6,799,049 B1 | 9/2004 | Zellner |
| 6,799,050 B1 | 9/2004 | Krasner |
| 6,801,159 B2 | 10/2004 | Swope |
| 6,804,524 B1 | 10/2004 | Vandermaijden |
| 6,807,534 B1 | 10/2004 | Erickson |
| 6,810,323 B1 | 10/2004 | Bullock |
| 6,813,264 B2 | 11/2004 | Vassilovski |
| 6,813,560 B2 | 11/2004 | Van Diggelen |
| 6,816,111 B2 | 11/2004 | Krasner |
| 6,816,580 B2 | 11/2004 | Timmins |
| 6,816,710 B2 | 11/2004 | Krasner |
| 6,816,719 B1 | 11/2004 | Heinonen |
| 6,816,734 B2 | 11/2004 | Wong |
| 6,820,269 B2 | 11/2004 | Baucke et al. |
| 6,829,475 B1 | 12/2004 | Lee |
| 6,832,373 B2 | 12/2004 | O'Neill |
| 6,839,020 B2 | 1/2005 | Geier |
| 6,839,021 B2 | 1/2005 | Sheynblat |
| 6,839,417 B2 | 1/2005 | Weisman |
| 6,842,715 B1 | 1/2005 | Gaal |
| 6,847,618 B2 | 1/2005 | Laursen |
| 6,847,822 B1 | 1/2005 | Dennison |
| 6,853,916 B2 | 2/2005 | Fuchs et al. |
| 6,856,282 B2 | 2/2005 | Mauro |
| 6,861,980 B1 | 3/2005 | Rowitch |
| 6,865,171 B1 | 3/2005 | Nilsson |
| 6,865,395 B2 | 3/2005 | Riley |
| 6,867,733 B2 | 3/2005 | Sandhu |
| 6,867,734 B2 | 3/2005 | Voor |
| 6,873,854 B2 | 3/2005 | Crockett |
| 6,876,734 B1 | 4/2005 | Summers |
| 6,882,850 B2 | 4/2005 | McConnell et al. |
| 6,885,874 B2 | 4/2005 | Grube |
| 6,885,940 B2 | 4/2005 | Brodie |
| 6,888,497 B2 | 5/2005 | King |
| 6,888,932 B2 | 5/2005 | Snip |
| 6,895,238 B2 | 5/2005 | Newell |
| 6,895,249 B2 | 5/2005 | Gaal |
| 6,900,758 B1 | 5/2005 | Mann |
| 6,903,684 B1 | 6/2005 | Simic |
| 6,904,029 B2 | 6/2005 | Fors |
| 6,907,224 B2 | 6/2005 | Younis |
| 6,907,238 B2 | 6/2005 | Leung |
| 6,912,230 B1 | 6/2005 | Salkini |
| 6,912,395 B2 | 6/2005 | Benes |
| 6,912,545 B1 | 6/2005 | Lundy |
| 6,915,208 B2 | 7/2005 | Garin |
| 6,917,331 B2 | 7/2005 | Gronemeyer |
| 6,930,634 B2 | 8/2005 | Peng |
| 6,937,187 B2 | 8/2005 | Van Diggelen |
| 6,937,872 B2 | 8/2005 | Krasner |
| 6,940,826 B1 | 9/2005 | Simard |
| 6,940,950 B2 | 9/2005 | Dickinson et al. |
| 6,941,144 B2 | 9/2005 | Stein |
| 6,944,540 B2 | 9/2005 | King |
| 6,947,772 B2 | 9/2005 | Minear |
| 6,950,058 B1 | 9/2005 | Davis |
| 6,957,073 B2 | 10/2005 | Bye |
| 6,961,562 B2 | 11/2005 | Ross |
| 6,963,557 B2 | 11/2005 | Knox |
| 6,965,754 B2 | 11/2005 | King |
| 6,965,767 B2 | 11/2005 | Maggenti |
| 6,968,044 B2 | 11/2005 | Beason |
| 6,970,917 B1 | 11/2005 | Kushwaha |
| 6,973,320 B2 | 12/2005 | Brown |
| 6,975,266 B2 | 12/2005 | Abraham |
| 6,978,453 B2 | 12/2005 | Rao |
| 6,980,816 B2 | 12/2005 | Rohler |
| 6,985,747 B2 | 1/2006 | Chithambaram |
| 6,993,355 B1 | 1/2006 | Pershan |
| 6,996,720 B1 | 2/2006 | DeMello |
| 6,999,782 B2 | 2/2006 | Shaughnessy |
| 7,024,321 B1 | 4/2006 | Deninger |
| 7,024,393 B1 | 4/2006 | Peinado |
| 7,047,411 B1 | 5/2006 | DeMello |
| 7,065,351 B2 | 6/2006 | Carter |
| 7,065,507 B2 | 6/2006 | Mohammed |
| 7,072,667 B2 | 7/2006 | Olrik |
| 7,079,857 B2 | 7/2006 | Maggenti |
| 7,103,018 B1 | 9/2006 | Hansen |
| 7,103,574 B1 | 9/2006 | Peinado |
| 7,106,717 B2 | 9/2006 | Rosseau |
| 7,110,773 B1 | 9/2006 | Wallace |
| 7,136,466 B1 | 11/2006 | Gao |
| 7,136,838 B1 | 11/2006 | Peinado |
| 7,151,946 B2 | 12/2006 | Maggenti |
| 7,174,153 B2 | 2/2007 | Ehlers |
| 7,177,397 B2 | 2/2007 | McCalmont |
| 7,177,398 B2 | 2/2007 | Meer |
| 7,177,399 B2 | 2/2007 | Dawson |
| 7,185,161 B2 | 2/2007 | Kang |

(56) References Cited

U.S. PATENT DOCUMENTS

| | | |
|---|---|---|
| 7,200,380 B2 | 4/2007 | Havlark |
| 7,209,758 B1 | 4/2007 | Moll et al. |
| 7,209,969 B2 | 4/2007 | Lahti |
| 7,218,940 B2 | 5/2007 | Niemenna |
| 7,221,959 B2 | 5/2007 | Lindquist |
| 7,245,900 B1 | 7/2007 | Lamb |
| 7,260,186 B2 | 8/2007 | Zhu |
| 7,260,384 B2 | 8/2007 | Bales et al. |
| 7,321,773 B2 | 1/2008 | Hines |
| 7,330,899 B2 | 2/2008 | Wong |
| 7,333,480 B1 | 2/2008 | Clarke |
| 7,369,508 B2 | 5/2008 | Parantainen |
| 7,369,530 B2 | 5/2008 | Keagy |
| 7,382,773 B2 | 6/2008 | Schoeneberger |
| 7,394,896 B2 | 7/2008 | Norton |
| 7,428,571 B2 | 9/2008 | Ichimura |
| 7,436,785 B1 | 10/2008 | McMullen |
| 7,440,442 B2 | 10/2008 | Grabelsky et al. |
| 7,561,586 B2 * | 7/2009 | Wang et al. .................... 370/401 |
| 7,573,982 B2 | 8/2009 | Breen |
| 7,602,886 B1 | 10/2009 | Beech |
| 7,711,094 B1 | 5/2010 | Olshansky |
| 7,783,297 B2 | 8/2010 | Ishii |
| 7,930,214 B2 * | 4/2011 | Knauerhase et al. ......... 705/26.1 |
| 8,089,986 B2 * | 1/2012 | Adamczyk et al. ............ 370/468 |
| 8,504,687 B2 * | 8/2013 | Maffione et al. .............. 709/224 |
| 2001/0011247 A1 | 8/2001 | O'Flaherty |
| 2001/0040886 A1 | 11/2001 | Jimenez |
| 2001/0049274 A1 | 12/2001 | Degraeve |
| 2002/0037735 A1 | 3/2002 | Maggenti |
| 2002/0052214 A1 | 5/2002 | Maggenti |
| 2002/0061760 A1 | 5/2002 | Maggenti |
| 2002/0069529 A1 | 6/2002 | Wieres |
| 2002/0077083 A1 | 6/2002 | Zellner |
| 2002/0077084 A1 | 6/2002 | Zellner |
| 2002/0077118 A1 | 6/2002 | Zellner |
| 2002/0077897 A1 | 6/2002 | Zellner |
| 2002/0086676 A1 | 7/2002 | Hendry |
| 2002/0098832 A1 | 7/2002 | Fleischer |
| 2002/0102996 A1 | 8/2002 | Jenkins |
| 2002/0102999 A1 | 8/2002 | Maggenti |
| 2002/0111172 A1 | 8/2002 | DeWolf |
| 2002/0112047 A1 | 8/2002 | Kushwaha |
| 2002/0118650 A1 | 8/2002 | Jagadeesan |
| 2002/0123327 A1 | 9/2002 | Vataja |
| 2002/0126656 A1 | 9/2002 | Park |
| 2002/0138650 A1 | 9/2002 | Yamamoto |
| 2002/0156732 A1 | 10/2002 | Odijk |
| 2002/0158777 A1 | 10/2002 | Flick |
| 2002/0173317 A1 | 11/2002 | Nykanen |
| 2002/0191595 A1 | 12/2002 | Mar |
| 2003/0009277 A1 | 1/2003 | Fan |
| 2003/0009602 A1 | 1/2003 | Jacobs |
| 2003/0012148 A1 | 1/2003 | Peters |
| 2003/0013449 A1 | 1/2003 | Hose |
| 2003/0016804 A1 | 1/2003 | Sheha |
| 2003/0026245 A1 | 2/2003 | Ejzak |
| 2003/0037163 A1 | 2/2003 | Kitada |
| 2003/0040272 A1 | 2/2003 | Lelievre |
| 2003/0061170 A1 | 3/2003 | Uzo |
| 2003/0065788 A1 | 4/2003 | Salomaki |
| 2003/0072318 A1 | 4/2003 | Lam |
| 2003/0078064 A1 | 4/2003 | Chan |
| 2003/0081557 A1 | 5/2003 | Mettala |
| 2003/0086422 A1 | 5/2003 | Klinker et al. |
| 2003/0096626 A1 | 5/2003 | Sabo et al. |
| 2003/0100320 A1 | 5/2003 | Ranjan |
| 2003/0101329 A1 | 5/2003 | Lahti |
| 2003/0101341 A1 | 5/2003 | Kettler |
| 2003/0103484 A1 | 6/2003 | Oommen |
| 2003/0108176 A1 | 6/2003 | Kung |
| 2003/0109245 A1 | 6/2003 | McCalmont |
| 2003/0114157 A1 | 6/2003 | Spitz |
| 2003/0119521 A1 | 6/2003 | Tipnis |
| 2003/0119528 A1 | 6/2003 | Pew |
| 2003/0125042 A1 | 7/2003 | Olrik |
| 2003/0137961 A1 | 7/2003 | Tsirtsis |
| 2003/0153340 A1 | 8/2003 | Crockett |
| 2003/0153341 A1 | 8/2003 | Crockett |
| 2003/0153342 A1 | 8/2003 | Crockett |
| 2003/0153343 A1 | 8/2003 | Crockett |
| 2003/0161298 A1 | 8/2003 | Bergman |
| 2003/0196105 A1 | 10/2003 | Fineberg |
| 2003/0204640 A1 | 10/2003 | Sahineja |
| 2003/0223381 A1 | 12/2003 | Schroderus |
| 2004/0002326 A1 | 1/2004 | Maher |
| 2004/0032485 A1 | 2/2004 | Stephens |
| 2004/0043775 A1 | 3/2004 | Kennedy |
| 2004/0044623 A1 | 3/2004 | Wake |
| 2004/0047461 A1 | 3/2004 | Weisman |
| 2004/0068665 A1 | 4/2004 | Fox |
| 2004/0068724 A1 | 4/2004 | Gardner |
| 2004/0092250 A1 | 5/2004 | Valloppillil |
| 2004/0098497 A1 | 5/2004 | Banet |
| 2004/0132465 A1 | 7/2004 | Mattila |
| 2004/0148357 A1 | 7/2004 | Corrigan et al. |
| 2004/0181689 A1 | 9/2004 | Kiyoto |
| 2004/0184584 A1 | 9/2004 | McCalmont |
| 2004/0185875 A1 | 9/2004 | Diacakis |
| 2004/0190497 A1 | 9/2004 | Knox |
| 2004/0198332 A1 | 10/2004 | Lundsgaard |
| 2004/0198386 A1 | 10/2004 | Dupray |
| 2004/0203922 A1 | 10/2004 | Hines |
| 2004/0205151 A1 | 10/2004 | Sprigg |
| 2004/0229632 A1 | 11/2004 | Flynn |
| 2004/0235493 A1 | 11/2004 | Ekerborn |
| 2004/0242238 A1 | 12/2004 | Wang |
| 2004/0267445 A1 | 12/2004 | De Luca |
| 2005/0028034 A1 | 2/2005 | Gantman |
| 2005/0039178 A1 | 2/2005 | Marolia |
| 2005/0041578 A1 | 2/2005 | Huotari |
| 2005/0043037 A1 | 2/2005 | Loppe |
| 2005/0053209 A1 | 3/2005 | D'Evelyn |
| 2005/0071671 A1 | 3/2005 | Karaoguz |
| 2005/0083911 A1 | 4/2005 | Grabelsky |
| 2005/0086467 A1 | 4/2005 | Asokan |
| 2005/0090236 A1 | 4/2005 | Schwinke |
| 2005/0838911 | 4/2005 | Grabelsky |
| 2005/0107673 A1 | 5/2005 | Ball |
| 2005/0112030 A1 | 5/2005 | Gaus |
| 2005/0119012 A1 | 6/2005 | Merheb |
| 2005/0132200 A1 | 6/2005 | Jaffe |
| 2005/0134504 A1 | 6/2005 | Harwood |
| 2005/0135569 A1 | 6/2005 | Dickinson et al. |
| 2005/0136885 A1 | 6/2005 | Kaltsukis |
| 2005/0149430 A1 | 7/2005 | Williams |
| 2005/0169248 A1 | 8/2005 | Truesdale |
| 2005/0174991 A1 | 8/2005 | Keagy |
| 2005/0192822 A1 | 9/2005 | Hartenstein |
| 2005/0201529 A1 | 9/2005 | Nelson |
| 2005/0209995 A1 | 9/2005 | Aksu |
| 2005/0213716 A1 | 9/2005 | Zhu |
| 2005/0232252 A1 | 10/2005 | Hoover |
| 2005/0243778 A1 | 11/2005 | Wang |
| 2005/0250516 A1 | 11/2005 | Shim |
| 2005/0259675 A1 | 11/2005 | Tuohino |
| 2005/0265318 A1 | 12/2005 | Khartabil |
| 2005/0266864 A1 | 12/2005 | Chen et al. |
| 2005/0271029 A1 | 12/2005 | Iffland |
| 2005/0282518 A1 | 12/2005 | D'Evelyn |
| 2005/0287979 A1 | 12/2005 | Rollender |
| 2005/0287990 A1 | 12/2005 | Mononen |
| 2005/0289097 A1 | 12/2005 | Trossen |
| 2006/0008065 A1 | 1/2006 | Longman et al. |
| 2006/0023747 A1 | 2/2006 | Koren et al. |
| 2006/0026288 A1 | 2/2006 | Acharya |
| 2006/0036680 A1 | 2/2006 | Shim |
| 2006/0053225 A1 | 3/2006 | Poikselka |
| 2006/0058042 A1 | 3/2006 | Shim |
| 2006/0058102 A1 | 3/2006 | Nguyen et al. |
| 2006/0064307 A1 | 3/2006 | Pakkala |
| 2006/0068753 A1 | 3/2006 | Karpen |
| 2006/0079249 A1 | 4/2006 | Shim |
| 2006/0120517 A1 | 6/2006 | Moon |

(56) References Cited

U.S. PATENT DOCUMENTS

| | | |
|---|---|---|
| 2006/0128395 A1 | 6/2006 | Muhonen |
| 2006/0135177 A1 | 6/2006 | Winterbottom |
| 2006/0188083 A1 | 8/2006 | Breen |
| 2006/0193447 A1 | 8/2006 | Schwartz |
| 2006/0212558 A1 | 9/2006 | Sahinoja |
| 2006/0212562 A1 | 9/2006 | Kushwaha |
| 2006/0225090 A1 | 10/2006 | Shim et al. |
| 2006/0234639 A1 | 10/2006 | Kushwaha |
| 2006/0234698 A1 | 10/2006 | Fok |
| 2006/0239205 A1 | 10/2006 | Warren |
| 2006/0242230 A1 | 10/2006 | Smith |
| 2006/0258380 A1 | 11/2006 | Liebowitz |
| 2006/0293024 A1 | 12/2006 | Benco |
| 2006/0293066 A1 | 12/2006 | Edge |
| 2007/0003024 A1 | 1/2007 | Olivier |
| 2007/0019614 A1 | 1/2007 | Hoffmann |
| 2007/0022011 A1 | 1/2007 | Altberg |
| 2007/0026854 A1 | 2/2007 | Nath |
| 2007/0026871 A1 | 2/2007 | Wager |
| 2007/0027997 A1 | 2/2007 | Polk |
| 2007/0030539 A1 | 2/2007 | Nath |
| 2007/0036139 A1 | 2/2007 | Patel |
| 2007/0037585 A1 | 2/2007 | Shim |
| 2007/0041513 A1 | 2/2007 | Gende |
| 2007/0049288 A1 | 3/2007 | Lamprecht |
| 2007/0072624 A1 | 3/2007 | Niemaenmaa |
| 2007/0081635 A1 | 4/2007 | Croak |
| 2007/0082681 A1 | 4/2007 | Kim |
| 2007/0082682 A1 | 4/2007 | Kim |
| 2007/0115941 A1 | 5/2007 | Patel |
| 2007/0121601 A1 | 5/2007 | Kikinis |
| 2007/0149213 A1 | 6/2007 | Lamba |
| 2007/0160036 A1 | 7/2007 | Smith |
| 2007/0162228 A1 | 7/2007 | Mitchell |
| 2007/0167177 A1 | 7/2007 | Kraufvelin |
| 2007/0182547 A1 | 8/2007 | Wachter |
| 2007/0202897 A1 | 8/2007 | Smith |
| 2007/0206568 A1 | 9/2007 | Silver |
| 2007/0206613 A1 | 9/2007 | Silver |
| 2007/0242660 A1 | 10/2007 | Xu |
| 2007/0243885 A1 | 10/2007 | Shim |
| 2007/0263610 A1 | 11/2007 | Mitchell |
| 2007/0270164 A1 | 11/2007 | Maier |
| 2008/0014931 A1 | 1/2008 | Yared |
| 2008/0020733 A1 | 1/2008 | Wassingbo |
| 2008/0037715 A1 | 2/2008 | Prozeniuk |
| 2008/0063153 A1 | 3/2008 | Krivorot |
| 2008/0065775 A1 | 3/2008 | Polk |
| 2008/0109650 A1 | 5/2008 | Shim |
| 2008/0117859 A1 | 5/2008 | Shahidi |
| 2008/0186164 A1 | 8/2008 | Emigh |
| 2008/0214202 A1 | 9/2008 | Toomey |
| 2008/0263169 A1 | 10/2008 | Brabec et al. |
| 2009/0137244 A1 | 5/2009 | Zhou et al. |
| 2009/0158136 A1 | 6/2009 | Rossano et al. |
| 2009/0158397 A1 | 6/2009 | Herzog et al. |
| 2009/0172804 A1 | 7/2009 | Spies et al. |
| 2009/0265552 A1 | 10/2009 | Moshir et al. |
| 2009/0265763 A1 | 10/2009 | Davies et al. |
| 2009/0320123 A1 | 12/2009 | Yu |
| 2010/0250603 A1 | 9/2010 | Balakrishnaiah |
| 2010/0287369 A1 | 11/2010 | Monden |
| 2010/0311447 A1 | 12/2010 | Jackson |
| 2011/0053618 A1 | 3/2011 | Lin et al. |
| 2011/0145564 A1 | 6/2011 | Moshir et al. |
| 2011/0219431 A1* | 9/2011 | Akhtar et al. ..................... 726/4 |
| 2011/0252146 A1 | 10/2011 | Santamaria et al. |
| 2011/0300830 A1 | 12/2011 | Ramrattan |
| 2011/0307947 A1 | 12/2011 | Kariv |
| 2012/0124367 A1 | 5/2012 | Ota et al. |
| 2012/0150968 A1 | 6/2012 | Yasrebi et al. |
| 2012/0192287 A1 | 7/2012 | Cai et al. |
| 2012/0198535 A1 | 8/2012 | Oberheide |
| 2013/0171971 A1 | 7/2013 | Fuji |
| 2013/0191908 A1 | 7/2013 | Klein |
| 2013/0202108 A1 | 8/2013 | Kao |
| 2013/0336210 A1* | 12/2013 | Connor et al. ................ 370/328 |

FOREIGN PATENT DOCUMENTS

| | | |
|---|---|---|
| WO | WO01/45342 | 6/2001 |
| WO | 0146666 | 11/2001 |
| WO | WO2004/025941 | 3/2004 |
| WO | 2005/022090 | 6/2005 |
| WO | WO2005/051033 | 6/2005 |
| WO | WO/2006/075856 | 7/2006 |

OTHER PUBLICATIONS

International Search Report in PCT/US2007/23243 dated Apr. 2, 2008.
PCT International Search Report (PCTUS2007/23714) and Written Opinion of International Searching Authority, Apr. 18, 2008.
Le-Pond Chin, Jyh-Hong Wen, Ting-Way Liu, the Study of the Interconnection of GSM Mobile Communication System Over IP based Network, May 6, 2001, IEEE, Vehicular Technology Conference, vol. 3, pp. 2219-2223.
Location Based Services V2 Roaming Support (non proprietary), 80-V8470-2NP A, dated Jan. 27, 2005, pp. 1-56.
Qualcomm CDMA Technologies, MS Resident User Plane LBS Roaming—80-VC718-1 E, 2006, pp. 1-37.
Qualcomm CDMA Technologies, LBS Control Plane/User Plane Overview—80-VD378-1 NP B, 2006, pp. 1-36.
Bhalla et al, TELUS, Technology Strategy—LBS Roaming Summit, Sep. 19, 2006.
Alfredo Aguirre, Iusacell, First and Only Carrier in Mexico with a 3G CDMA Network, 2007.
Mike McMullen, Sprint, LBS Roaming Summit, Sep. 19, 2006.
Andrew Yeow, BCE, LBS Roaming Summit, Sep. 19, 2006, pp. 1-8.
Qualcomm CDMA Technologies, LBS Control Plane Roaming—80-VD377-1NP A, 2006, pp. 1-10.
International Search Report received in PCT/US2013/21199 dated Mar. 26, 2013.
International Search Report received in PCT/US2012/068083 dated Feb. 8, 2013.

* cited by examiner

QUALITY OF SERVICE TO OVER THE TOP APPLICATIONS USED WITH VPN

The present invention is a continuation-in-part of U.S. application Ser. No. 14/032,913, filed Sep. 20, 2013, entitled "Mechanisms For Quality of Service to Over the Top Applications For Use in Commercial Wireless Networks"; which claims priority from U.S. Provisional No. 61/714,944, filed Oct. 17, 2012, entitled "Mechanisms for Quality of Service to Over the Top Applications For Use In Commercial Wireless Networks". The present application also claims priority from U.S. Provisional No. 61/815,976, filed Apr. 25, 2013, entitled "Quality of Service to Over the Top Applications Used with VPN"; and from U.S. Provisional No. 61/829,745, filed May 31, 2013, entitled "Quality of Service to Over the Top Applications Used with VPN". The entirety of all four of these applications are expressly incorporated herein by reference.

BACKGROUND OF THE INVENTION

1. Field of the Invention

This invention relates generally to Quality of Service (QoS) control for Virtual Private Network(s) (VPNs) established between smart phones and private networks (e.g., enterprise or agency intranet) over Long Term Evolution (LTE) commercial wireless networks. These VPN(s) may be used by smart phone applications to access data in the cloud in a secure manner and typically involve tunneling of original application IP packets in an encrypted fashion inside of an outer IP packet.

2. Background of Related Art

Verizon Wireless™ has recently become the first commercial service provider to fully launch a network with Long Term Evolution (LTE) 4G wireless broadband technology. Long Term Evolution (LTE) 4G wireless broadband technology is a recent technology that supports a fast and efficient all-Internet Protocol (IP) network (i.e., a network that provides services, e.g., voice, video, data, messaging, etc., solely over the Internet). It is expected that the majority of commercial service providers will also adopt an all-Internet Protocol (IP) network at some time in the near future.

As the future of technology gears toward an all-IP network, the number of available over-the-top (OTT) applications is expected to increase. An over-the-top (OTT) application is an application that uses a data channel provided by an Internet service provider (ISP) to connect to the Internet instead of using any special data handling features or network services offered thereby.

In accordance with conventional technology, over-the-top (OTT) application data is sometimes routed over a commercial wireless network via a virtual private network (VPN) tunnel (which involves the tunneling of original IP packets inside outer IP packets in an encrypted fashion). A virtual private network (VPN) tunnel provides additional transmission security to over-the-top (OTT) application data, which is especially helpful to over-the-top (OTT) applications that lack end-to-end encryption on their network connections.

Quality of service (QoS) refers to a set of performance characteristics by which a commercial wireless network is expected to convey data traffic to and from a client (quality of service (QoS) control mechanisms are applied to both the wireless and wireline components of a commercial network). Specific performance characteristics may include throughput (i.e. data quantity transmitted per unit time), latency (i.e. time delay between transmission and receipt of data), loss rate (i.e. frequency by which a commercial wireless network fails to deliver portions of transmitted data), jitter (i.e. a measure of variance of other characteristics), etc.

Currently, there exist several inherent limitations to the quality of service (QoS) treatment that a commercial wireless network is able to provide its' clients. For example, the maximum throughput that a commercial wireless network is able to provide across all clients is dependant on: a spectrum allocation held by the commercial wireless network, a backhaul infrastructure setup between cellular towers and fixed infrastructure within the commercial wireless network, the number of cellular towers in use within the commercial wireless network, the size of a footprint assigned to each cellular tower in use within the commercial wireless network, and any sources of electromagnetic interference within the commercial wireless network.

It is found that applications (e.g. smart phone applications) typically run better (i.e., perform more objective work per unit time and provide better user experience) when they are receiving a higher level of quality of service (QoS) treatment from a commercial wireless network as opposed to a lower level of quality of service (QoS) treatment. Consequently, many clients/service providers enter into contractual agreements with commercial wireless networks to ensure that they receive a data conveyance that is at-or-above a desired minimum performance level. For example, a commercial wireless network may agree (in exchange for monetary compensation) to provide a minimum of 12 kilobit/second throughput and a minimum of 0.1 second latency to a client user equipment (UE) that desires to receive real-time streaming video feed over that wireless network.

Commercial wireless networks use well-known internal techniques to ensure that contracted clients receive a pre-negotiated level of quality of service (QoS) treatment. For example, a network operator may delay transmitting data for one low-level quality of service (QoS) client to prioritize data transmission for another high-level quality of service (QoS) client. Likewise, a network operator may discard data packets transmitted to/from one low-level quality of service (QoS) client more frequently, to ensure data conveyance for another high-level quality of service (QoS) client.

Unfortunately, vendors of over-the-top (OTT) applications and associated data do not typically enter into contractual quality of service (QoS) agreements with commercial wireless networks (e.g. Long Term Evolution (LTE) networks). Therefore, over-the-top (OTT) applications are typically unable to benefit from quality of service (QoS) control mechanisms (e.g. priority, packet delay, guaranteed bit rate, etc.) available thereon. Instead, most over-the-top (OTT) applications (e.g., Skype, Netflix, etc.) provide services on a best-effort basis (i.e., data delivery, efficiency not guaranteed).

Differentiated Services (DiffServ) has defined a mechanism for classifying and managing network traffic on modern Internet Protocol (IP) networks, for the purposes of providing quality of service (QoS) treatment thereon. In particular, DiffServ uses a 6 bit field (i.e. a DS field) in an IP header for packet classification purposes.

In accordance with conventional DiffServ technology, a DS field may be influenced (set) by an application generating IP packets. Moreover, a virtual private network (VPN) client may copy a DiffServ header from an incoming application IP packet (that will eventually be encapsulated) to an IP header of a tunneling IP packet to extend DiffServ quality of service (QoS) treatment to a virtual private network (VPN) environment.

However, though smart phone applications, application cores in the cloud, and virtual private network (VPN) software may all influence the setting of a DS field, there is no guarantee that an Internet Protocol (IP) network (e.g. a long term evolution (LTE) network) will honor a DS field setting and provide desired quality of service (QoS) treatment, being that: first, the honoring of a DS field is not mandated by current standards and, second, triggering quality of service (QoS) treatment in such a fashion defeats the purpose of quality of service (QoS) control as, conceivably, all types of data traffic flowing through an IP network could be marked for preferential treatment by a source application.

As commercial wireless networks begin carrying data for over-the-top (OTT) mission critical applications, such as applications used by emergency dispatch personnel and emergency first responders, a best-effort treatment of over-the-top (OTT) applications will no longer be acceptable. This is especially true in times of disaster, when networks are likely heavily congested. Hence, a successful means of extending quality of service (QoS) treatment to over-the-top (OTT) applications, including over-the-top (OTT) applications transmitting data over a virtual private network (VPN) tunnel, is needed.

SUMMARY

A method and apparatus for extending conventional quality of service (QoS) treatment to over-the-top (OTT) applications transmitting data over a commercial wireless network via a virtual private network (VPN) tunnel, comprises a quality of service (QoS) server. In accordance with the principles of the present invention, an over-the-top (OTT) application server and a virtual private network (VPN) client/server routing data to/from the over-the-top (OTT) application server over a virtual private network (VPN) tunnel, are each integrated with a quality of service (QoS) server. Following integration, the over-the-top (OTT) application server and/or the virtual private network (VPN) client/server may request and get desired quality of service (QoS) treatment for application data routed by the over-the-top (OTT) application over the virtual private network (VPN) tunnel. The present invention is applicable to both single-tenant virtual private network (VPN) tunnels and multi-tenant virtual private network (VPN) tunnels.

In accordance with the principles of the present invention, a single-tenant virtual private network (VPN) tunnel (i.e. a virtual private network (VPN) tunnel that is treated as a single application) is only permitted one quality of service (QoS) designation at a time. Hence, a quality of service (QoS) designation requested for/by an application routing data over a single-tenant virtual private network (VPN) tunnel is applied to all application data routed over that virtual private network (VPN) tunnel.

Alternatively, applications routing data over a multi-tenant virtual private network (VPN) tunnel are acknowledged independently and assigned their own individual quality of service (QoS) designations. Hence, a quality of service (QoS) designation requested for/by an application routing data over a multi-tenant virtual private network (VPN) tunnel is applied to application data routed by that requesting over-the-top (OTT) application, only. In accordance with the principles of the present invention, a multi-tenant virtual private network (VPN) tunnel may define a default quality of service (QoS) designation for application data routed to/from applications that have not indicated a preferred quality of service (QoS) designation.

In accordance with the principles of the present invention, the quality of service (QoS) server forwards desired quality of service (QoS) rules embedded in a quality of service (QoS) request message to a policy and charging rules function (PCRF) on a requesting over-the-top (OTT) application/virtual private network (VPN) client devices' home mobile network operator (MNO). If a client device is roaming, then the policy and charging rules function (PCRF) on the client devices' home mobile network operator (MNO) forwards received quality of service (QoS) rules to a policy and charging rules function (PCRF) serving the client device. Quality of service (QoS) treatment is then carried out in a conventional manner by the serving policy and charging rules function (PCRF).

In accordance with the principles of the present invention, a connection between a quality of service (QoS) server and a policy and charging rules function (PCRF) is preferably established via a diameter Rx interface. Accordingly, the primary function of a quality of service (QoS) server is to translate diameter protocol messages to other communication mediums and vice versa.

In accordance with the principles of the present invention, an over-the-top (OTT) application must provide identification details and register services and application characteristics with the quality of service (QoS) server before that application is permitted to request quality of service (QoS) treatment therefrom. During registration with the quality of service (QoS) server, an over-the-top (OTT) application is required to provision one or more quality of service (QoS) application profiles, each indicating a desired level of quality of service (QoS).

In accordance with the principles of the present invention, a virtual private network (VPN) client/server must furnish relevant tunneling information to the quality of service (QoS) server before that virtual private network (VPN) client/server is permitted to request quality of service (QoS) treatment therefrom. Relevant tunneling information varies depending upon a type of virtual private network (VPN) tunnel established. In particular, during registration with the quality of service (Qos) server, a single-tenant virtual private network (VPN) tunnel is required to provision identification details and one or more quality of service (QoS) application profiles on the quality of service (QoS) server. Alternatively, during registration with the quality of service (Qos) server, a multi-tenant virtual private network (VPN) tunnel must provision identification details and adequate tunneling information on the quality of service (QoS) server, but need not preprovision any quality of service (QoS) application profiles. Tunneling information furnished to the quality of service (QoS) server for a multi-tenant virtual private network (VPN) tunnel must enable the quality of service (QoS) to identify IP packets associated with application data routed thereover.

In accordance with the principles of the present invention, a quality of service (QoS) application profile ID identifying a particular quality of service (QoS) application profile (i.e. quality of service (QoS) rules), is included in each quality of service (QoS) request message sent to the quality of service (QoS) server. A quality of service (QoS) application profile ID indicates to the quality of service (QoS) server a particular quality of service (QoS) application profile to invoke.

When an over-the-top (OTT) application server detects a termination of signaling or service on an over-the-top (OTT) application client device, the over-the-top (OTT) application server sends a quality of service (QoS) termination message to the quality of service (QoS) server, to indicate that reserved quality of service (QoS) values may be terminated on the client devices' home mobile network operator (MNO).

Likewise, a virtual private network (VPN) client/server must inform the quality of service (QoS) server when a virtual private network (VPN) tunnel has terminated.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

Figure 1:
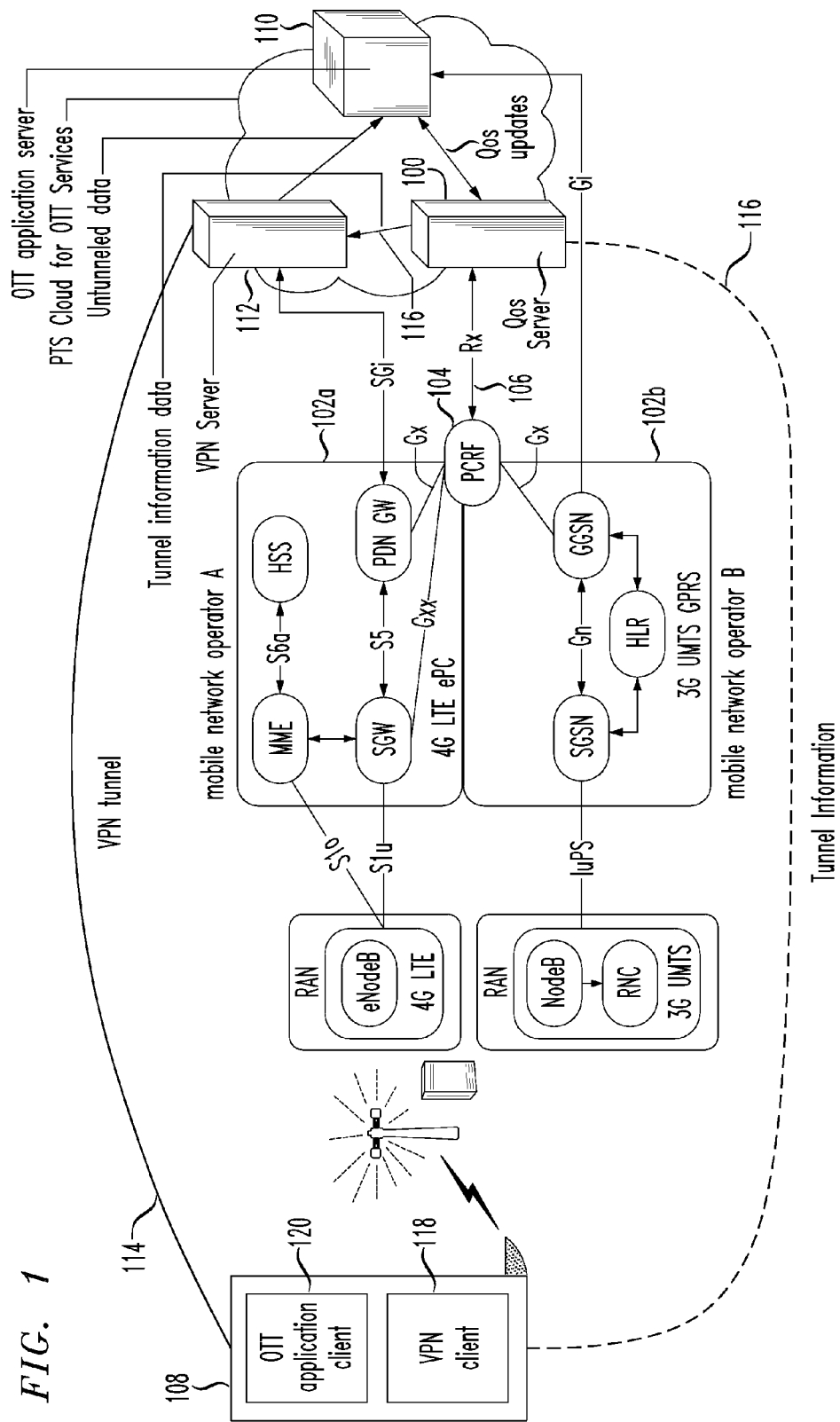
FIG. 1 depicts an exemplary network structure for extending conventional quality of service (QoS) treatment to over-the-top (OTT) applications routing data over a commercial wireless network via a virtual private network (VPN) tunnel, in accordance with the principles of the present invention.

The present invention extends conventional quality of service (QoS) treatment to over-the-top (OTT) applications transmitting data over a commercial wireless network (e.g. a long term evolution (LTE) network) via a virtual private network (VPN) tunnel.

New wireless standards, such as long term evolution (LTE), only specify data connectivity, and do not specify any applications. Applications, rather, are expected to be facilitated via carrier-hosted application frameworks (e.g. an internet multimedia system (IMS)).

To ensure that applications carried out via carrier-hosted application frameworks operate at a desired level of quality of service (QoS) (e.g. packet delay, priority, etc.), new wireless standards have defined a policy and charging rules function (PCRF). A policy and charging rules function (PCRF) is a network element (in a long term evolution (LTE) packet core) that may be accessed by carrier-hosted application frameworks (e.g. IMS) (via a diameter protocol based interface (Rx)) for the purposes of providing quality of service (QoS) treatment to applications.

Unfortunately, applications to which policy and charging rules functions (PCRF) are expected to extend quality of service (QoS) treatment, do not include over-the-top (OTT) applications. An over-the-top (OTT) application is an application that provides services/content to a client user equipment (UE) over the Internet, absent the involvement of an Internet service provider (ISP). Hence, conventional over-the-top (OTT) applications are not facilitated via carrier-hosted application frameworks, and are thus not able to benefit from quality of service (QoS) treatment available on today's commercial wireless networks. Rather, conventional over-the-top (OTT) applications are typically forced to operate on a best-effort basis (i.e. data delivery, efficiency not guaranteed).

With the future of technology gearing towards an all IP-network (e.g. a long term evolution (LTE) network), over-the-top (OTT) applications are expected to become increasingly common. As commercial wireless networks begin carrying data for over-the-top (OTT) mission critical applications, such as those applications used by emergency dispatch personnel and emergency first responders, a best effort treatment of over-the-top (OTT) application data will no longer be acceptable.

The present invention expands a method of extending conventional quality of service (QoS) treatment to over-the-top (OTT) applications routing data over a commercial wireless network, as disclosed in co-pending and co-owned U.S. patent application Ser. No. 14/032,913, filed Sep. 20, 2013, entitled: "MECHANISMS FOR QUALITY OF SERVICE TO OVER THE TOP APPLICATIONS FOR USE IN COMMERCIAL WIRELESS NETWORKS", claiming priority from U.S. Provisional Application No. 61/703,554, filed Sep. 20, 2012, entitled: "MECHANISMS FOR QUALITY OF SERVICE TO OVER THE TOP APPLICATIONS FOR USE IN COMMERCIAL WIRELESS NETWORKS", and from U.S. Provisional No. 61/714,944, filed Oct. 17, 2012, entitled "MECHANISMS FOR QUALITY OF SERVICE TO OVER THE TOP APPLICATIONS FOR USE IN COMMERCIAL WIRELESS NETWORKS", all of which are explicitly incorporated herein by reference. Mechanisms for quality of service control disclosed in U.S. patent Ser. No. 14/032,913 address a scenario wherein an over-the-top (OTT) application connects to a cloud based application infrastructure directly.

The present invention addresses a variation of the scenario described in U.S. application Ser. No. 14/032,913. In particular, the present invention addresses a scenario wherein an over-the-top (OTT) application client on a user equipment (UE) is connected to a cloud based over-the-top (OTT) application server via a virtual private network (VPN) connection. A conventional virtual private network (VPN) connection provides additional transport security to over-the-top (OTT) application data traversing a commercial wireless network, by tunneling original IP packets inside outer IP packets in an encrypted fashion. Mechanisms for establishing a virtual private network (VPN) tunnel appropriate to convey over-the-top (OTT) application data are well known to those skilled in the art.

In accordance with the principles of the present invention, conventional quality of service (QoS) treatment is extended to over-the-top (OTT) applications transmitting data over a commercial wireless network (e.g. a long term evolution (LTE) network) via a virtual private network (VPN) tunnel, without requiring that modifications be made to over-the-top (OTT) applications, and without requiring that over-the-top (OTT) application developers negotiate separate quality of service (QoS) agreements with mobile network operators (MNO). Moreover, the present invention extends conventional quality of service (QoS) treatment to virtual private networks (VPN) carrying over-the-top (OTT) application data without burdening virtual private networks (VPN) with network integration aspects, such as: knowledge of user location, knowledge of a policy and charging rules function (PCRF), knowledge of a long term evolution (LTE) packet core, etc.

In accordance with the principles of the present invention, an over-the-top (OTT) application server and a virtual private network (VPN) client/server carrying data to/from that over-the-top (OTT) application server over a virtual private network (VPN) tunnel, are each integrated with an inventive quality of service (QoS) server. Following integration, the over-the-top (OTT) application server and/or the virtual private network (VPN) client/server may send a quality of service (QoS) request message to the inventive quality of service (QoS) server (via an appropriate virtual private network (VPN) client/server interface or over-the-top (OTT) application interface) to request that desired quality of service (QoS) treatment (identified by a quality of service (QoS) application profile ID) be applied to application data routed by the over-the-top (OTT) application over the virtual private network (VPN) tunnel.

The inventive quality of service (QoS) server forwards quality of service (QoS) rules embedded in a quality of service (QoS) request message to a policy and charging rules function (PCRF) residing on a requesting over-the-top (OTT) application/virtual private network (VPN) client devices' home mobile network operator (MNO). If the client device is roaming, then the policy and charging rules function (PCRF) on that device's home mobile network operator (MNO) forwards quality of service (QoS) rules to a policy and charging rules function (PCRF) serving the client device. Quality of service (QoS) treatment is then carried out by the policy and charging rules function (PCRF) in a conventional manner.

In accordance with the principles of the present invention, an over-the-top (OTT) application server and/or a virtual private network (VPN) client/server may modify a previously requested level of quality of service (QoS) treatment, when a previously requested level of quality of service (QoS) treatment is not resulting in desired performance.

The inventive solution may be applied to various virtual private network (VPN) technologies, including: a layer 2 tunneling protocol (L2TP) technology, a point-to-point tunneling protocol (PPTP) technology, a transport layer security/virtual private network (VPN) technology, etc. However, for illustrative purposes, the present invention is described herein via use of an IPSec virtual private network (VPN) technology configured in tunnel mode. In accordance with conventional IPSec virtual private network (VPN) technology, all IP datagrams (including both datagram header and datagram packet) routed over a virtual private network (VPN) tunnel are first encapsulated inside new IP datagrams with IPSec headers.

Figure 4:
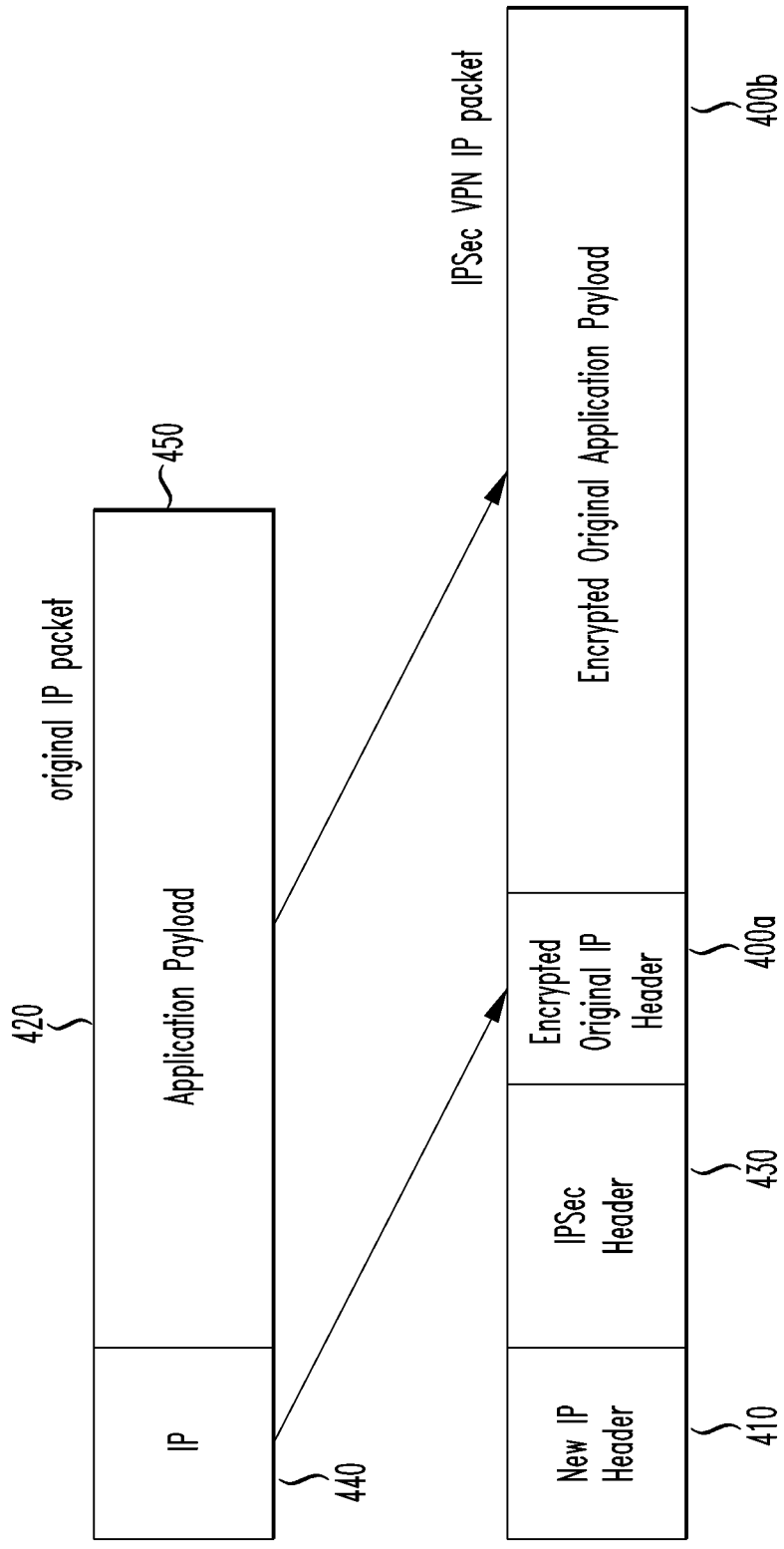
FIG. 4 depicts conventional encryption and encapsulation of an original IP packet, in accordance with conventional IPSec virtual private network (VPN) technology.

FIG. 4 depicts conventional encryption and encapsulation of an original IP packet, in accordance with conventional IPSec virtual private network (VPN) technology.

In particular, an original IP packet 420 (including an original IP header 440 and an original application payload 450) is encrypted 400a, 400b and encapsulated in an outer IP packet 410 with an IPSec header 430 before it is routed over a conventional IPSec virtual private network (VPN) tunnel. A virtual private network (VPN) client/server also interprets an original IP packet 420 and assigns an appropriate security parameter index (SPI) value (in accordance with a preconfigured security parameter index (SPI) value) thereto before routing the IP packet over a virtual private network (VPN) tunnel. A security parameter index (SPI) value serves as an index to a conventional security association database (SADB) (i.e. a database that maintains information for a virtual private network (VPN) tunnel) maintained for a virtual private network (VPN) tunnel. A security association database (SADB) preferably includes some or all of the following information: security association information (i.e. security parameter index, IPSec protocol, IP destination address) and security policy information (i.e. IP source address, IP destination address, fully qualified domain name, source port number, destination port number, quality of service (QoS) application profile ID).

The present invention is applicable to both single-tenant virtual private network (VPN) tunnels and multi-tenant virtual private network (VPN) tunnels.

Figure 5:
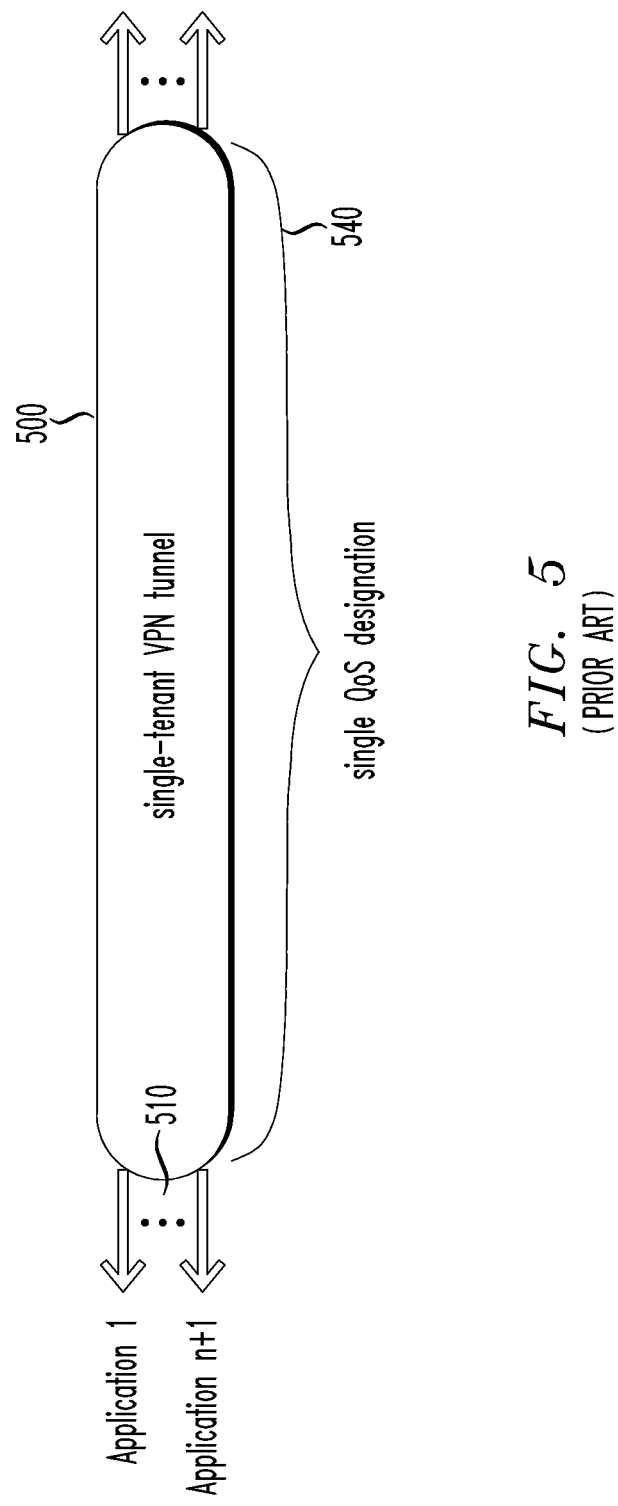
FIG. 5 depicts a conventional single-tenant virtual private network (VPN) tunnel.

FIG. 5 depicts a conventional single-tenant virtual private network (VPN) tunnel.

In particular, a single-tenant virtual private network (VPN) tunnel 500 is always treated as a single application, regardless of how many applications 510 actually utilize the tunnel 500. Therefore, a single-tenant virtual private network (VPN) tunnel 500 is only permitted one quality of service (QoS) designation 540 at a time. In accordance with the principles of the present invention, a quality of service (QoS) designation requested for/by an application routing data over a single-tenant virtual private network (VPN) tunnel 500 is applied to all application data 510 routed over that virtual private network (VPN) tunnel 500.

Figure 6:
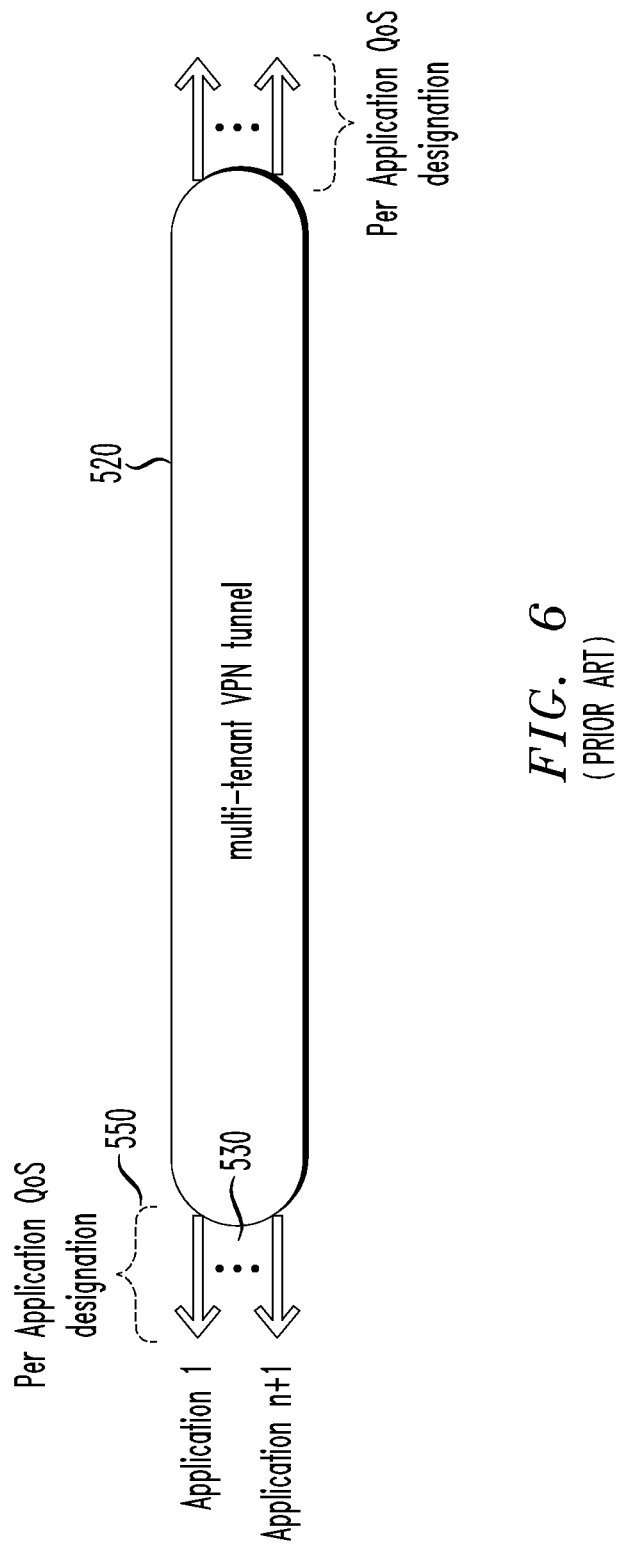
FIG. 6 depicts a conventional multi-tenant virtual private network (VPN) tunnel.

FIG. 6 depicts a conventional multi-tenant virtual private network (VPN) tunnel.

As portrayed in FIG. 6, applications 530 transmitting data over a multi-tenant virtual private network (VPN) tunnel 520 are acknowledged independently and may thus be assigned their own individual quality of service (QoS) designations 550. A quality of service (QoS) designation 550 requested for/by an application routing data over a multi-tenant virtual private network (VPN) tunnel 500 is only applied to application data routed by that application.

FIG. 1 depicts an exemplary network structure for extending conventional quality of service (QoS) treatment to over-the-top (OTT) applications routing data over a commercial wireless network via a virtual private network (VPN) tunnel, in accordance with the principles of the present invention.

In particular, as depicted in FIG. 1, a quality of service (QoS) server 100 is configured to directly interface with one or more commercial wireless networks 102a, 102b via a conventional policy and charging rules function (PCRF) (i.e. an IP multimedia subsystem (IMS)/long term evolution (LTE) network component) 104. In accordance with the principles of the present invention, a connection between a quality of service (QoS) server 100 and a policy and charging rules function (PCRF) 104 is preferably established via a diameter Rx interface 106 (3GPP specifications 29.209, 29.214). Hence, the primary function of a quality of service (QoS) server 100 is to translate diameter protocol interface 106 messages to other communication mediums and vice versa.

Once a connection is established between a policy and charging rules function (PCRF) 104 and the quality of service (QoS) server 100, the inventive quality of service (QoS) server 100 takes on the role of a special application function (AF) connected on the backend (i.e. not accessible to a user) 110 of one or more disparate applications. The quality of service (QoS) server 100 also establishes a connection with a virtual private network (VPN) server 112 and/or virtual private network (VPN) client 118, when application data exchanged between an over-the-top (OTT) application client 120 and an over-the-top (OTT) application server 110 happens over a virtual private network (VPN) tunnel 114.

As depicted in FIG. 1, the inventive quality of service (QoS) server 100 uses a secure virtual private network (VPN) client/server interface 116 to interface with a virtual private network (VPN) client 118/server 112 on either end of a virtual private network (VPN) tunnel 114. In accordance with the principles of the present invention, virtual private network (VPN) clients 118/servers 112 use the virtual private network (VPN) client/server interface 116 to provide relevant tunneling information to the quality of service (QoS) server 100. Relevant tunneling information enables the quality of service (QoS) server 100 to identify IP packets associated with over-the-top (OTT) application data transmitted over a virtual private network (VPN) tunnel 114.

In accordance with the principles of the present invention, a virtual private network (VPN) tunnel 114 is established between a virtual private network (VPN) client 118 on a user equipment 108, and a fixed infrastructure virtual private network (VPN) server 112, so that data traffic transmitted to/from one or more over-the-top (OTT) application clients 120 on the user equipment (UE) 108 may traverse the virtual private network (VPN) tunnel 114. A virtual private network (VPN) tunnel 114 encrypts and encapsulates an original IP packet inside an outer IP packet while the IP packet is traversing a commercial wireless network. An underlying commercial wireless network 102*a*, 102*b* is typically configured to provide a certain level of quality of service (QoS) treatment to traffic traversing a virtual private network (VPN) tunnel 114.

In accordance with the principles of the present invention, the quality of service (QoS) server 100 must be able to communicate with backend applications 110, carrier policy and charging rules (PCRF) function(s) 104, and virtual private network (VPN) clients 118/servers 112, simultaneously. Simultaneous communication may be permitted via a firewall setting and/or other network configuration rules.

In accordance with the principles of the present invention, a quality of service (QoS) server 100 may be located separate from a mobile network operator (MNO) 102*a*, 102*b* or co-located with a mobile network operator (MNO) 102*a*, 102*b*. Possible mobile network operator (MNO) integration targets currently include: a universal mobile telecommunications system (UMTS), long term evolution (LTE) technology, an evolved-universal mobile telecommunications system (E-UMTS), long term evolution (LTE) technology advanced, and Wi-Fi. The quality of service (QoS) server 100 may easily be extended to support additional network interfaces as technology evolves.

Figure 2:
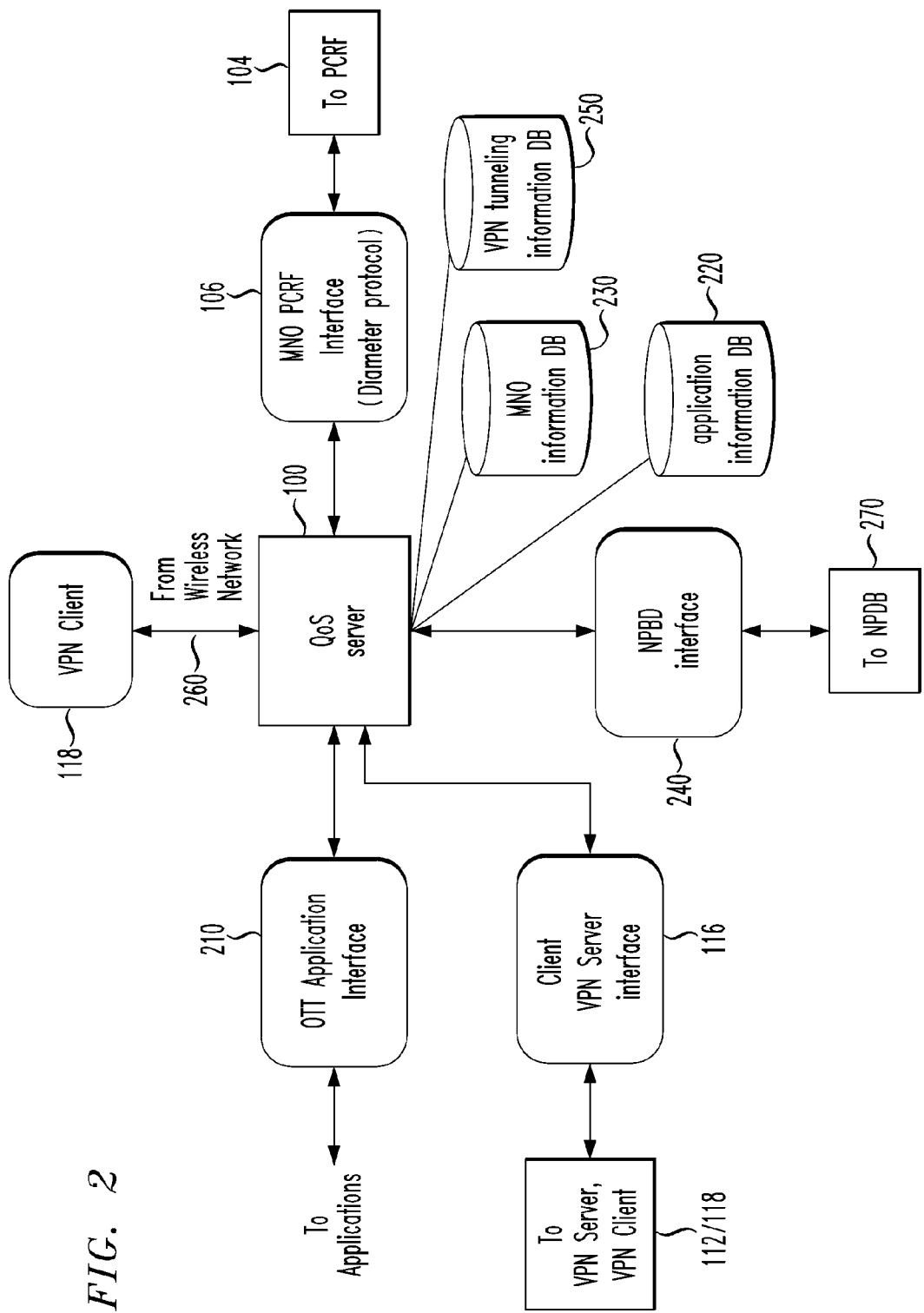
FIG. 2 depicts an exemplary quality of service (QoS) server architecture, in accordance with the principles of the present invention.

FIG. 2 depicts an exemplary quality of service (QoS) server architecture, in accordance with the principles of the present invention.

In particular, as portrayed in FIG. 2, the inventive quality of service (QoS) server 100 interacts with a mobile network operator (MNO) policy and charging rules function (PCRF) interface (a diameter protocol interface) 106, an over-the-top (OTT) application interface 210, a number portability database (NPDB) interface 240, and a virtual private network (VPN) client/server interface 116 to extend quality of service (QoS) treatment to applications routing data over a commercial wireless network 102*a*, 102*b* via a virtual private network (VPN) tunnel 114.

In accordance with the principles of the present invention, the quality of service (QoS) server 100 maintains profiles and information for over-the-top (OTT) applications in a local application information database 220, tunneling and IP packet information for registered virtual private network (VPN) tunnels in a local virtual private network (VPN) tunneling information database 250, and home mobile network operator (MNO) information for over-the-top (OTT) application client devices in a local mobile network operator (MNO) information database 230.

If by chance the quality of service (QoS) server 100 is not able to find home mobile network operator (MNO) information for a requesting client device 108 in the local mobile network operator (MNO) information database 230, then the quality of service (QoS) server 100 accesses a number portability database (NPDB) interface 240 to retrieve relevant home mobile network operator (MNO) information from an external number portability database (NPDB) 270.

The over-the-top (OTT) application interface 210, as depicted in FIG. 2, is designed to operate over a secure, transport layer security (TLS)/secure sockets layer (SSL) communications channel that utilizes representational state transfer (REST) hypertext transfer protocol (HTTP), hypertext transfer protocol (HTTP), simple object access protocol (SOAP), extensible markup language (XML), etc., message formats. New mediums for the over-the-top (OTT) application interface 210 may be defined and used, as appropriate, as long as application quality of service (QoS) message formats (i.e. attributes and corresponding values included in application quality of service messages) conform minimally to application quality of service (QoS) message formats described herein (i.e. an application quality of service (QoS) request message format, an application quality of service (QoS) response message format, and an application quality of service (QoS) termination message format).

As previously stated, the quality of service (QoS) server 100 uses a diameter Rx protocol (3GPP 29.214) to interface 106 with a mobile network operator (MNO) policy and charging rules function (PCRF) 104. A mobile network operator (MNO) policy and charging rules function (PCRF) interface 106, as depicted in FIG. 2, provides discovery and addressing of a home policy and charging rules function (HPCRF) 104 assigned to a requesting over-the-top (OTT) application/virtual private network (VPN) client device 108. The mobile network operator (MNO) policy and charging rules function (PCRF) interface 106 is also enhanced to allow tracking registration of the following IP header information: a virtual private network (VPN) security parameter index (SPI) (per RFC 2401, as required with IPSec protocol by a virtual private network (VPN) client/server) and an IPSec protocol (per RFC 2401).

In accordance with the principles of the present invention, the quality of service (QoS) server 100 assumes the role of an application function (AF) and complies with policy and charging rules function (PCRF) 104 discovery and addressing, as described in a 3GPP series 29.213 specification. In support of this 3GPP series 29.213 specification, the quality of service (QoS) server 100 preferably maintains a table with a fully qualified domain name (FQDN) or internet protocol (IP) address of a policy and charging rules function (PCRF) 104, for each supported single policy and charging rules function (PCRF) mobile network operator (MNO), and a diameter routing agent, for each supported multi-policy and charging rules function (PCRF) mobile network operator (MNO).

The quality of service (QoS) server 100 interfaces with a home policy and charging rules function (HPCRF) 104, regardless as to whether or not a client user equipment (UE) 108 is roaming. A home policy and charging rules function (HPCRF) 104 coordinates a download of quality of service (QoS) rules to a visiting policy and charging rules function (VPCRF) in a roaming network (per 3GPP standards) when a requesting client user equipment (UE) 108 is roaming.

In accordance with the principles of the present invention, number portability databases (NPDB) 270 and the local mobile network operator (MNO) information database 230 (as shown in FIG. 2) support multiple transaction capabilities application part (TCAP) based protocols (e.g., advanced intelligent network (AIN), intelligent network application protocol (INAP), American national standards institute ((ANSI)-41), etc.) for number portability queries, since such protocols support queries from both wireline and wireless networks based on various standards. The quality of service (QoS) server 100 preferably uses a number portability request (NPREQ) TCAP query (per telecommunications industry association/electronic industries association (TIA/EIA)-756A and telecommunications industry association/electronic industries association (TIA/EIA) ANSI41-D specifications) to determine a current mobile network operator (MNO) associated with an over-the-top (OTT) application client device 108. The quality of service (QoS) server 100 may easily be extended to support other protocols for number portability lookup.

As previously stated, the quality of service (QoS) server 100 uses a virtual private network (VPN) client/server interface 116 to interface with a virtual private network (VPN) client 118 and/or a virtual private network (VPN) server 112. The virtual private network (VPN) client/server interface 116, as portrayed in FIG. 2, is designed to operate over a secure transport layer security (TLS)/secure sockets layer (SSL) communications channel that utilizes representational state transfer (REST) hypertext transfer protocol (HTTP), hypertext transfer protocol (HTTP), simple object access protocol (SOAP), extensible markup language (XML), etc., message formats. The quality of service (QoS) server 100 may also/alternatively interface with a virtual private network (VPN) client 118 via a wireless network connection 260.

New mediums for the virtual private network (VPN) client/server interface 116 may be defined and used as appropriate, as long as VPN quality of service (QoS) message formats (i.e. attributes and corresponding values included in VPN quality of service (QoS) messages) conform minimally to VPN quality of service (QoS) message formats described herein (i.e. a VPN quality of service (QoS) request message format, a VPN quality of service (QoS) response message format, and a VPN quality of service (QoS) termination message format). Depending upon the implementation, a VPN quality of service (QoS) message may additionally be embedded in a defined message format, e.g., a radius or diameter message format.

Figure 3:
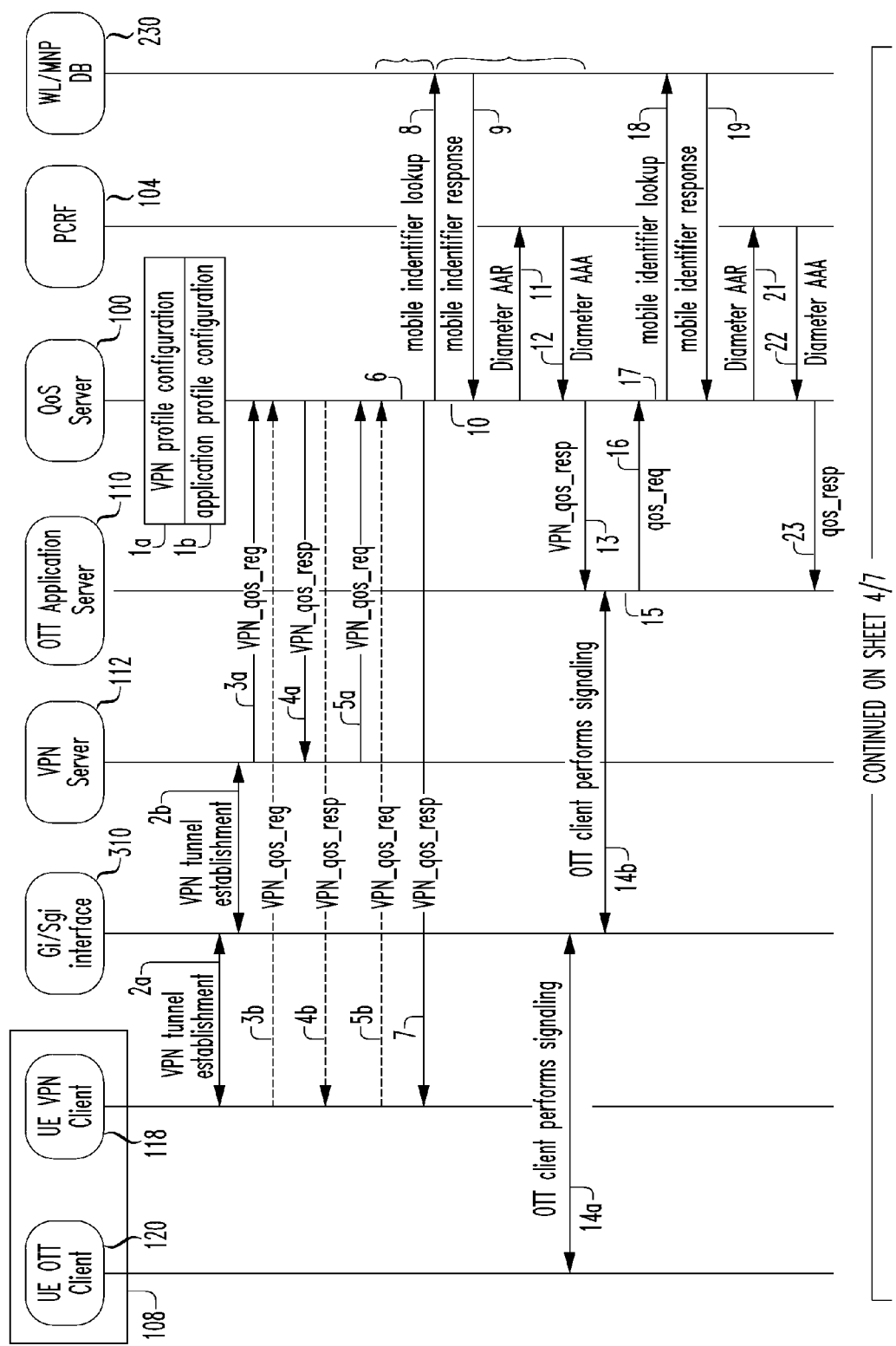
FIG. 3 depicts an exemplary process flow for extending quality of service (QoS) treatment to over-the-top (OTT) applications routing data over a commercial wireless network via a virtual private network (VPN) tunnel, in accordance with the principles of the present invention.
Figure 3:
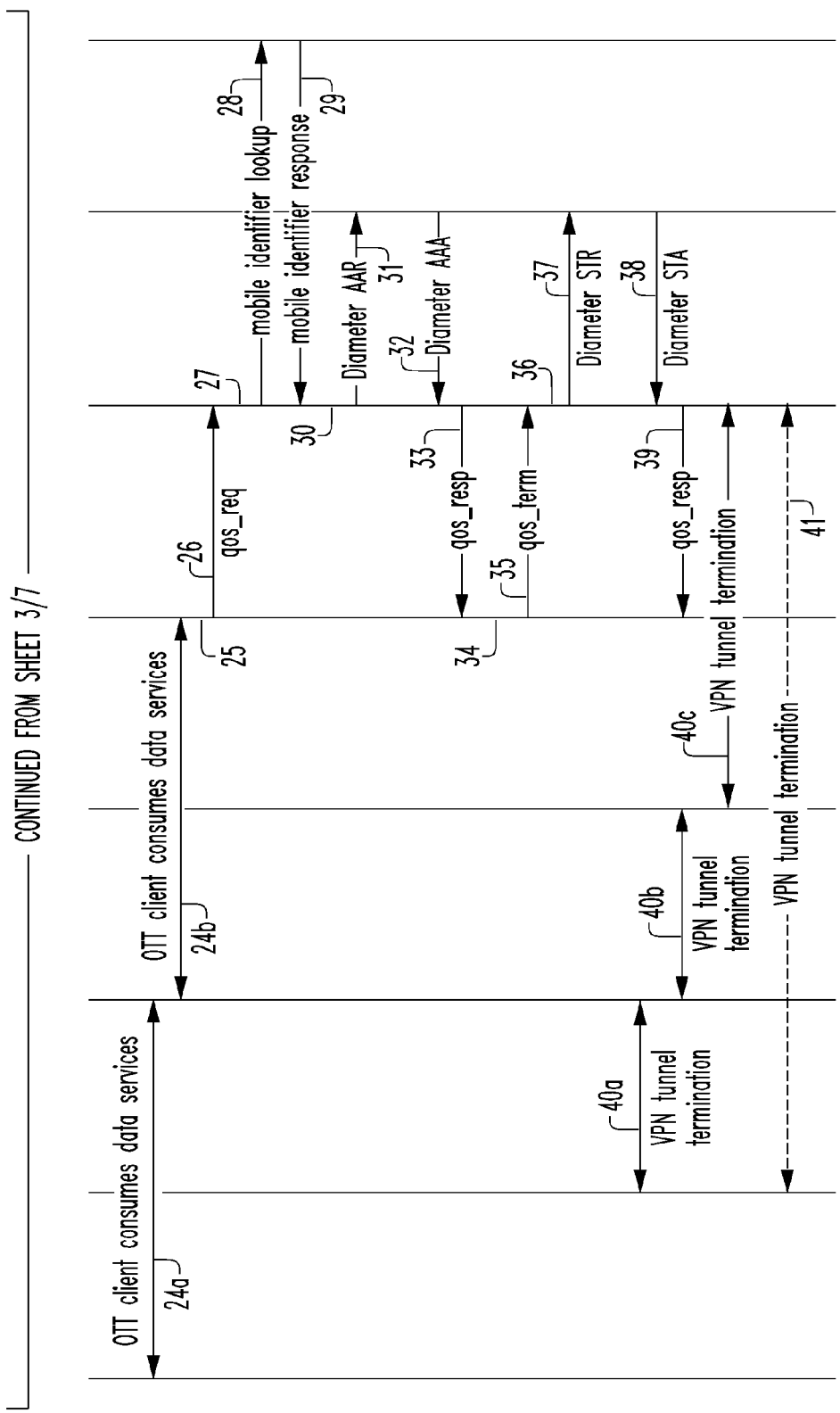

FIG. 3 depicts an exemplary process flow for extending quality of service (QoS) treatment to over-the-top (OTT) applications routing data over a commercial wireless network via a virtual private network (VPN) tunnel, in accordance with the principles of the present invention.

In particular, as shown in step 1a of FIG. 3, a virtual private network (VPN) tunnel performs VPN profile configuration with a quality of service (QoS) server 100 via an authenticated virtual private network (VPN) client/server interface 116. During virtual private network (VPN) profile configuration, a virtual private network (VPN) client/server furnishes relevant tunneling information to the quality of service (QoS) server 100 for a virtual private network (VPN) tunnel established therebetween. Relevant tunneling information varies depending upon the type of virtual private network (VPN) tunnel established.

In particular, a single-tenant virtual private network (VPN) tunnel 500 provisions one or more quality of service (QoS) application profiles (and corresponding quality of service application profile IDs) on the quality of service (QoS) server 100 during VPN profile configuration. A quality of service (QoS) application profile includes tunnel identification details and indicates a desired level of quality of service (QoS) treatment.

Alternatively, a multi-tenant virtual private network (VPN) tunnel 520 provisions identification details on the quality of service (QoS) server 100 during VPN profile configuration, but need not provision any quality of service application profiles. Rather, over-the-top (OTT) applications 530 utilizing a multi-tenant virtual private network (VPN) tunnel 520 provision their own quality of service (QoS) application profiles on the quality of service (QoS) server 100 during application profile configuration, performed in step 1b. A quality of service (QoS) designation requested by an over-the-top (OTT) application transmitting data over a multi-tenant virtual private network (VPN) tunnel 520 is associated to that multi-tenant virtual private network (VPN) tunnel 520.

In accordance with the principles of the present invention, a multi-tenant virtual private network (VPN) 520 tunnel must provide adequate tunneling information (including IPSec security policy and IPSec security association information) to the quality of service (QoS) server 100 during VPN profile configuration. Adequate tunneling information is any information that enables the quality of service (QoS) server 100 to determine actual IP header information 440 associated with application data routed over the multi-tenant virtual private network (VPN) tunnel 520. Moreover, tunneling information must enable the quality of service (QoS) server 100 to adequately communicate quality of service (QoS) rules defined in a quality of service (QoS) request message to a relevant policy and charging rules function (PCRF) 104.

Table 1 depicts exemplary tunneling information provided to the quality of service (QoS) server during virtual private network (VPN) profile configuration.

TABLE 1

| Security Association (Tunnel Header Information) | | | Security Policy Information (For Encapsulated Traffic) | | | | | |
|---|---|---|---|---|---|---|---|---|
| Security Parameter Index | IPSec Protocol | IP Destination Address | IP Source Address | IP Destination Address | Fully Qualified Domain Name | Source Port Number | Destination Port Number | QoS-Application-Profile-ID |

In particular, as portrayed in Table 1, IPSec security policy information (for encapsulated data traffic) and IPSec security association information (tunnel header information) relevant to a virtual private network (VPN) tunnel is provided to the quality of service (QoS) server 100 during VPN profile configuration (step 1a). Relevant IPSec security policy information preferably includes: an IP source address, an IP destination address, a fully qualified domain name, a source port number, a destination port number, and a quality of service application profile ID. Relevant IPSec security association information preferably includes: a security parameter index, an IPSec protocol, and an IP destination address.

Updated tunneling information must be furnished to the quality of service (QoS) server 100 for each new virtual private network (VPN) tunnel that is established. In accordance with the principles of the present invention, tunneling information may either be preprovisioned on the quality of service (QoS) server 100 during VPN profile configuration, or provided to the quality of service (QoS) server 100 dynamically, via use of a VPN quality of service (QoS) registration message.

As portrayed in step 1b of FIG. 3, an application performs application profile configuration on the quality of service (QoS) server 100 via an authenticated over-the-top (OTT) application interface 210. In accordance with the principles of the present invention, an over-the-top (OTT) application must provide identification details and register services and application characteristics with a quality of service (QoS) server

100 before that application is permitted to request quality of service (QoS) treatment therefrom. For security purposes, the quality of service (QoS) server 100 only accepts registration attempts from over-the-top (OTT) applications for which the quality of service (QoS) server 100 has been pre-configured to accept registration attempts. Therefore, not all over-the-top (OTT) applications are permitted to register with a quality of service (QoS) server 100. Moreover, over-the-top (OTT) applications that are granted registration with a quality of service (QoS) server 100 are only permitted to receive levels of quality of service (QoS) treatment for which they have been pre-authorized to receive. Quality of service (QoS) requests are validated by the quality of service (QoS) server 100 before they are processed. An over-the-top (OTT) application also identifies service abilities and provisions one or more quality of service (QoS) application profiles on the quality of service (QoS) server 100 during application profile configuration.

However, before an over-the-top (OTT) application can register and provision quality of service (QoS) application profiles on the quality of service (QoS) server 100, the quality of service (QoS) server 100 must first collect the following data from the over-the-top (OTT) application (more characteristics may be required as new application characteristics present themselves): an over-the-top (OTT) application identifier, over-the-top (OTT) access credentials, one or more quality of service (QoS) application profile IDs, over-the-top (OTT) application characteristics, and one or more mobile network operator (MNO) associations.

In accordance with the principles of the present invention, an over-the-top (OTT) application identifier is a unique string (synchronized with a carrier provided "AF-Application-Identifier") that is provided to an over-the-top (OTT) application via an out-of-band mechanism. An over-the-top (OTT) application identifier may be prefixed with quality of service (QoS) unique identifiers for use on the quality of service (QoS) server 100.

Over-the-top (OTT) access credentials (e.g. a secret/password or public key infrastructure (PKI) verification) are a set of credentials agreed upon by an over-the-top (OTT) application and the quality of service (QoS) server 100 in an out of band manner.

A quality of service (QoS) application profile ID is a quality of service (QoS) specific value, defined per application identifier. More particularly, the quality of service (QoS) application profile ID is defined by the quality of service (QoS) server 100 and provided to an over-the-top (OTT) application via an out of band mechanism.

In accordance with the principles of the present invention, a quality of service (QoS) application profile ID points to a quality of service (QoS) application profile that is to be provisioned for an over-the-top (OTT) application. A quality of service (QoS) application profile contains application details (e.g. service characteristics, etc.) and indicates a desired level of quality of service (QoS) treatment. A quality of service (QoS) application profile ID is referenced in each quality of service (QoS) request message sent to the quality of service (QoS) server 100, to indicate to the quality of service (QoS) server 100 a particular quality of service (QoS) application profile to invoke. In accordance with the principles of the present invention, an over-the-top (OTT) application may provision multiple quality of service (QoS) application profiles to indicate varying levels of desired quality of service (QoS).

Over-the-top (OTT) application characteristics provided to the quality of service (QoS) server 100 during application profile configuration include (this list may be extended as new requirements develop, either by 3GPP specifications or via over-the-top (OTT) evolution): a media component number (i.e. an ordinal number of a media component), a media sub-component (i.e. a set of flows for one flow identifier), an application identifier, a media type (e.g. audio (0), video (1), data (2), application (3), control (4), text (5), message (6), other (0xFFFFFFFF)), a maximum requested bandwidth (Bw) uplink (UL), a maximum requested bandwidth (Bw) downlink (DL), a flow status, a reservation priority, RS bandwidth (Bw), RR bandwidth (Bw), codec data, and a tunnel encapsulation indicator, e.g., yes, no, IPSec, etc.

In accordance with the principles of the present invention, a media sub-component field may include the following characteristics: a flow number (i.e. an ordinal number of the IP flow), a flow description (e.g. uplink (UL) and/or downlink (DL)), a flow status, flow usage, a maximum requested bandwidth (Bw) uplink (UL), a maximum requested bandwidth (Bw) downlink (DL), and an application function (AF) signaling protocol.

Moreover, a mobile network operator (MNO) associations field provided to the quality of service (QoS) server 100 during application profile configuration identifies all of the networks for which an over-the-top (OTT) application is authorized to designate quality of service (QoS) settings. Values in a mobile network operator (MNO) associations field are defined per quality of service (QoS) implementation and represent system logical identifiers for the purposes of routing communications to particular policy and charging rules (PCRF) functions.

In accordance with the principles of the present invention, once required application data is furnished to the quality of service (QoS) server 100, an over-the-top (OTT) application provisions one or more quality of service (QoS) application profiles on the quality of service (QoS) server 100. Following quality of service (QoS) application profile provisioning, the over-the-top (OTT) application may begin submitting registrations to the quality of service (QoS) server 100, on a per user equipment (UE) basis. In accordance with the principles of the present invention, an over-the-top (OTT) application is required to register with the quality of service (QoS) server 100 periodically.

Following application profile configuration, an over-the-top (OTT) application may send quality of service (QoS) requests to the quality of service (QoS) server 100, on a per user equipment (UE) basis.

As shown in steps 2*a* and 2*b* of FIG. 3, a virtual private network (VPN) tunnel 114 is established between a virtual private network (VPN) client 118 on a user equipment (UE) 108 and a fixed infrastructure virtual private network (VPN) server 112, so as to allow data traffic transmitted to/from one or more over-the-top (OTT) application clients 120 (that have undergone application profile configuration on the quality of service (QoS) server 100) on the user equipment (UE) 108 to traverse the tunnel 114.

In accordance with the principles of the present invention, the virtual private network (VPN) client 118/server 112 sends a VPN quality of service (QoS) registration message with appropriate tunneling information to the quality of service (QoS) server 100 during VPN tunnel establishment, as depicted in steps 3*a* and 3*b* of FIG. 3. Upon receipt of the VPN quality of service (QoS) registration message, the quality of service (QoS) server 112 returns a VPN quality of service (QoS) registration response message to the virtual private network (VPN) client 118/server 112, as depicted in steps 4*a* and 4*b* of FIG. 3. VPN tunneling information may alternatively be provisioned on the quality of service (QoS) server 100 during VPN profile configuration.

Once VPN registration with the quality of service (QoS) server 100 is complete, the virtual private network (VPN) client 118/server 112 may send a VPN quality of service (QoS) request message to the quality of service (QoS) server 100 to request desired quality of service (QoS) treatment therefrom, as shown in steps 5a and 5b of FIG. 3.

In accordance with the principles of the present invention, VPN quality of service (QoS) registration and request messages preferably include: a message ID (i.e. an identifier defined by, and unique to, a requesting virtual private network (VPN) server 112/client 118), a quality of service (QoS) application profile ID (optional), a publically available mobile network assigned source framed internet protocol (IP) address (an attribute-value pair (AVP)) or framed IPv6 prefix (an attribute-value pair (AVP), RFC 4005 [12]), a flow description (an attribute-value pair (AVP), 3GPP 29.214), a virtual private network (VPN) security parameter index (SPI) (per RFC 2041, as required with IPSec protocol by the virtual private network (VPN) client/server), an IPSec protocol (per RFC 2041), a virtual private network (VPN) IP destination (i.e. a routable IP address for the virtual private network (VPN) server), and a VPN-CS.

A quality of service (QoS) application profile ID in a VPN quality of service (QoS) request message indicates a desired level of quality of service (QoS) treatment. A quality of service (QoS) application profile ID is required in a VPN quality of service (QoS) request message when the message is provided to the quality of service (QoS) server 100 dynamically. Otherwise, the quality of service (QoS) server 100 derives a quality of service (QoS) application profile ID based on a combination of values embedded in the VPN quality of service (QoS) request message.

A flow description is required in a VPN quality of service (QoS) request message when a quality of service (QoS) application profile ID is not provided therein. In accordance with the principles of the present invention, a flow description must comprise one of the following two directions: 'in' or 'out', whereas direction 'in' refers to an uplink (UL) IP flow and direction 'out' refers to a downlink (DL) IP flow. A flow description may also contain: a source and destination IP address (possibly masked), a protocol and a source and destination port (a source port may be omitted to indicate that any source port is allowed). Lists and ranges may not be used to indicate source and/or destination ports.

In accordance with the principles of the present invention, the quality of service (QoS) server 100 accepts VPN quality of service (QoS) request messages from both a virtual private network (VPN) client 118 and a virtual private network (VPN) server 112. Hence, depending upon the implementation, some information may be missing from a VPN quality of service (QoS) request message.

When both a virtual private network (VPN) server 112 and a virtual private network (VPN) client 118 send a VPN quality of service (QoS) request message to the quality of service (QoS) server 100 for a single VPN connection 114, messages from each source must include a reference to the other, to enable the quality of service (QoS) server 100 to successfully assemble all relevant information and assign an appropriate quality of service (QoS) designation to over-the-top (OTT) application data traversing the virtual private network (VPN) connection 114. A VPN-CS field is preferably used to provide such a reference.

In particular, when VPN quality of service (QoS) request messages are sent by both a virtual private network (VPN) server 112 and a virtual private network (VPN) client 118 for a single virtual private network (VPN) connection 114, optional attribute tag, 'VPN-CS' is preferably included therein. Optional attribute tag 'VPN-CS' contains a unique message identifier that is used by both a virtual private network (VPN) server 112 and a virtual private network (VPN) client 118, to show that messages refer to a single virtual private network (VPN) connection 114.

As shown in step 6 of FIG. 3, the quality of service (QoS) server 100 performs VPN quality of service (QoS) request message validation in response to a VPN quality of service (QoS) request message received thereon. In particular, during VPN quality of service (QoS) request message validation, the quality of service (QoS) server 100 validates a quality of service (QoS) application profile ID received in the VPN quality of service (QoS) request message.

In accordance with the principles of the present invention, the quality of service (QoS) server 100 may either determine a quality of service (QoS) application profile ID directly or indirectly from the VPN quality of service (QoS) request message. Indirect determination of a quality of service (QoS) application profile ID includes analyzing and matching VPN quality of service (QoS) request message parameters to an appropriate quality of service (QoS) application profile ID. Once a quality of service (QoS) application profile ID is determined, the quality of service (QoS) server 100 performs one of the following two potential courses of action, depending upon the type of virtual private network (VPN) tunnel 114 established in steps 2a-4b.

In particular, if the virtual private network tunnel (VPN) 114 is a multi-tenant virtual private network (VPN) tunnel 520, then the quality of service (QoS) server 100 records and tracks virtual private network (VPN) 114 tunneling information received in the VPN quality of service (QoS) request message in a virtual private network (VPN) tunneling information database 250, and subsequently returns a VPN quality of service (QoS) response message to the requesting virtual private network (VPN) client 118/server 112, as depicted in step 7. In accordance with the principles of the present invention, the quality of service (QoS) server 100 then waits to receive an application quality of service (QoS) registration message or an application quality of service (QoS) termination message from an over-the-top (OTT) application routing or attempting to route data over the virtual private network (VPN) tunnel 114.

In a multi-tenant virtual private network (VPN) scenario, if a quality of service (QoS) application profile ID received in an application quality of service (QoS) request message differs from a quality of service (QoS) application profile ID embedded in a VPN quality of service (QOS) request message, the quality of service (QoS) application profile ID in the application quality of service (QoS) request message is used to influence quality of service (QoS) treatment.

Alternatively, if the virtual private network tunnel (VPN) 114 established in steps 2a-4b is a single-tenant virtual private network (VPN) tunnel 500, then the quality of service (QoS) server 100 immediately applies quality of service (QoS) rules received in the VPN quality of service (QoS) registration or request message to all application data routed over the virtual private network (VPN) tunnel 114. The quality of service rules are extracted from the VPN quality of service (QoS) registration message if that is the only message received and VPN quality of services (QoS) request message if both are received.

In particular, when a VPN quality of service (QoS) registration (or request if received) message is received from a single-tenant virtual private network (VPN) client 118/server 112, the quality of service (QoS) server 100 queries a local mobile network operator (MNO) information database 230 to retrieve home mobile network operator (MNO) information for the over-the-top (OTT) application/virtual private network (VPN) client device 108, as depicted in step 8. If the quality of service (QoS) server 100 cannot find home mobile network operator (MNO) information for the client device in the local mobile network operator (MNO) information database 230, then the quality of service (QoS) server 100 alternatively queries an external number portability database (NPDB) 270 via a number portability database (NPDB) interface 240. Results from either the number portability database (NPDB) 270 or the local mobile network operator (MNO) information database 230 provide the quality of service (QoS) server 100 with enough information to determine a home mobile network operator (MNO) for the over-the-top (OTT) application/VPN client device 108 (step 9).

Once a home mobile network operator (MNO) is identified, the quality of service (QoS) server 100 uses the quality of service (QoS) application profile ID defined in the VPN quality of service (QoS) registration (or request if received) message to determine whether or not over-the-top (OTT) applications routing data over the virtual private network (VPN) tunnel are authorized to influence quality of service (QoS) treatment on the home mobile network operator (MNO) (step 10). In this particular example, there is only one over-the-top (OTT) application configured to transmit data over the virtual private network (VPN) tunnel 114.

In accordance with the principles of the present invention, if the over-the-top (OTT) application configured to route data over the virtual private network (VPN) tunnel 114 is permitted to influence quality of service (QoS) settings on the home mobile network operator (MNO), then the quality of service (QoS) server 100 sends a diameter authentication/authorization request (AAR) message with appropriate quality of service (QoS) information to a policy and charging rules function (PCRF) 104 on the client devices' 108 home mobile network operator (MNO), as shown in step 11.

In step 12, the policy and charging rules function (PCRF) 104 on the client devices' 108 home mobile network operator (MNO) receives the quality of service (QoS) information and returns a diameter authentication/authorization answer (AAA) message to the quality of service (QoS) server 100.

Upon receipt of the diameter authentication/authorization answer (AAA) message, the quality of service (QoS) server 100 sends a VPN quality of service (QoS) response message to the requesting VPN client 118/server 112, as depicted in step 13.

In accordance with the principles of the present invention, a VPN quality of service (QoS) response message preferably includes: a message ID, an application identifier, and a status identifier.

A status identifier included in a status field of a VPN quality of service (QoS) response message may be any one or more of the following: a success status identifier (100), a quality of service (QoS) system failure status identifier (200) (indicating a default failure or unexpected failure with no available details), a failed validation of application identifier/access credentials status identifier (201), a failed validation of quality of service (QoS) profile ID status identifier (202), a quality of service (QoS) system failure reserved message status identifier (defined per quality of service (QoS) implementation and used to explain a unique system failure) (203-299), a PCRF unavailable status identifier (300), and/or an AAR/AAA message failure status identifier (400), wherein the entire contents of the AAA message is embedded in the status field.

Once the virtual private network (VPN) tunnel 114 is setup between the virtual private network (VPN) client 118 on the user equipment 108 and the virtual private network (VPN) server 112, the over-the-top (OTT) application client 120 configured to route data over the virtual private network (VPN) tunnel 114 may use the virtual private network (VPN) tunnel 114 to register with a corresponding over-the-top (OTT) application server 110 (via a Gi/SGi interface 310), as shown in steps 14a and 14b of FIG. 3.

When the over-the-top (OTT) application server 110 receives a service registration request from the over-the-top (OTT) application client 120, the over-the-top (OTT) application server 110 may attempt to establish a mutually authenticated (client 120 and server 110) transport layer security (TLS)/secure sockets layer (SSL) connection with the inventive quality of service (QoS) server 100 (via standard TLS/SSL procedures for mutual authentication), as shown in step 15.

If the initial mutual authentication step is successful, then the over-the-top (OTT) application server 110 sends an application quality of service (QoS) request message to the quality of service (QoS) server 100 to request that a desired level of quality of service (QoS) treatment be applied to application data routed by that over-the-top (OTT) application over the virtual private network (VPN) tunnel 114, as portrayed in step 16.

In accordance with the principles of the present invention, a quality of service (QoS) request message preferably includes: a message ID (i.e. an identifier defined by, and unique to, a requesting over-the-top (OTT) application), an application identifier (as described in 3GPP series 29.214 specification), access credentials (e.g. a secret/password public key infrastructure (PKI) verification, etc.), a quality of service (QoS) application profile ID, a source framed internet protocol (IP) address (an attribute-value pair (AVP)) or framed IPv6 prefix (an attribute-value pair (AVP), RFC 4005 [12]), a service uniform resource name (URN) (an attribute-value pair (AVP), 3GPP 29.214), a reservation priority (TS 183.017 [15]) (a vendor ID shall be set to european telecommunications standards institute (ETSI) (13019) [15]), a subscription ID (RFC 4006 [14]) identifying a particular subscription (e.g. international mobile subscriber identity (IMSI), mobile subscriber integrated services digital network (MSISDN), etc.), and a flow description (an attribute-value pair (AVP), 3GPP 29.214).

A flow description in an application quality of service (QoS) request message must comprise one of the following two directions: 'in' or 'out', whereas direction 'in' refers to an uplink (UL) IP flow and direction 'out' refers to a downlink (DL) IP flow. A flow description in an application quality of service (QoS) request message may also contain: a source and destination IP address (possibly masked), a protocol, and a source and destination port (a source port may be omitted to indicate that any source port is allowed). Lists and ranges may not be used to indicate source and/or destination ports.

A quality of service (QoS) application profile ID in an application quality of service (QoS) request message indicates appropriate quality of service (QoS) information to send to a home policy and charging rules function (PCRF) 104.

In accordance with the principles of the present invention, the quality of service (QoS) server 100 performs application quality of service (QoS) request message validation in response to an application quality of service (QoS) request message received thereon, as portrayed in step 17 of FIG. 3.

During application quality of service (QoS) request message validation, the quality of service (QoS) server 100 validates the application identifier, access credentials (e.g. a secret/password public key infrastructure (PKI) verification, etc.), and quality of service (QoS) application profile ID received in the application quality of service (QoS) request message, against application profiles maintained in a local application information database 220. The quality of service (QoS) server 100 validates the format and values of application quality of service (QoS) request message attributes in accordance with a 3GPP series 29.214 specification.

When application quality of service (QoS) request message validation is complete, the quality of service (QoS) server 100 queries a local mobile network operator (MNO) information database 230 to retrieve home mobile network operator (MNO) information for the requesting over-the-top (OTT) application client device 108, as depicted in step 18. If the quality of service (QoS) server 100 cannot find home mobile network operator (MNO) information for the requesting client device 108 in the local mobile network operator (MNO) information database 230, then the quality of service (QoS) server 100 alternatively queries an external number portability database (NPDB) 270 via a number portability database (NPDB) interface 240. Results from either the number portability database (NPDB) 270 or the local mobile network operator (MNO) information database 230 provide the quality of service (QoS) server 100 with enough information to determine a home mobile network operator (MNO) for the requesting client device 108.

Once a home mobile network operator (MNO) is identified (step 19), the quality of service (QoS) server 100 uses a quality of service (QoS) application profile ID, defined in the application quality of service (QoS) request message, to determine whether or not the requesting over-the-top (OTT) application is authorized to influence quality of service (QoS) treatment on the home mobile network operator (MNO).

In step 20 of FIG. 3, if the over-the-top (OTT) application is permitted to influence quality of service (QoS) settings on the home mobile network operator (MNO), then the quality of service (QoS) server 100 queries a local virtual private network (VPN) tunneling information database 250 to determine actual IP packet information associated with application data routed by the over-the-top (OTT) application over the virtual private network (VPN) tunnel 114.

In step 21 of FIG. 3, the quality of service (QoS) server 100 sends a diameter authentication/authorization request (AAR) message with appropriate quality of service (QoS) information and appropriate IP tunneling data to a policy and charging rules function (PCRF) 104 on the client devices' 108 home mobile network operator (MNO). Appropriate quality of service (QoS) information depends on the type of virtual private network (VPN) tunnel 114 routing data.

In particular, if the virtual private network (VPN) tunnel 114 is a single-tenant virtual private network (VPN) tunnel 520, then the diameter authentication/authorization request (AAR) message assigns quality of service (QoS) rules defined in the application quality of service (QoS) request message to all application data routed over the virtual private network (VPN) tunnel 114, as previously described in steps 11-13. This assignment allows mapping to the application quality of service (QoS) request message.

Rather, if the virtual private network (VPN) tunnel 114 is a multi-tenant virtual private network (VPN) tunnel 500, then the quality of service (QoS) server 100 assigns quality of service (QoS) rules defined in the application quality of service (QoS) request message to application data being routed for the requesting over-the-top (OTT) application, only. In particular, the quality of service (QoS) server 100 sends a diameter authentication/authorization request (AAR) message with appropriate quality of service (QoS) rules and appropriate tunnel packet identification information to a policy and charging rules function (PCRF) 104 on the client devices' 108 home mobile network operator (MNO). Tunnel packet identification information sent to the policy and charging rules function (PCRF) must enable the policy and charging rules function (PCRF) to identify which tunnel packets to assign the requested quality of service (QoS) designation.

As portrayed in step 22, the policy and charging rules function (PCRF) 104 on the client devices' 108 home mobile network operator (MNO) receives quality of service (QoS) information and returns a diameter authentication/authorization answer (AAA) message to the quality of service (QoS) server 100.

In step 23, the quality of service (QoS) server 100 sends a quality of service (QoS) application response message with an appropriate status value to the over-the-top (OTT) application server 110.

In accordance with the principles of the present invention, a quality of service (QoS) application response message preferably comprises: a message ID, an application identifier, and a status identifier.

A status identifier included in a status field of a quality of service (QoS) application response message may be any one or more of the following: a success status identifier (100), a quality of service (QoS) system failure status identifier (200) (indicating a default failure or unexpected failure with no available details), a failed validation of application identifier/access credentials status identifier (201), a failed validation of quality of service (QoS) profile ID status identifier (202), a quality of service (QoS) system failure reserved message status identifier (defined per quality of service (QoS) implementation and used to explain a unique system failure) (203-299), a PCRF unavailable status identifier (300), and/or an AAR/AAA message failure status identifier (400), wherein the entire contents of the AAA message is embedded in the status field.

Once quality of service (QoS) rules have been forwarded to the policy and charging rules function (PCRF) 104 on the client devices' 108 home mobile network operator (MNO), the over-the-top (OTT) application client 120 can proceed to transmit and consume data for service delivery purposes (i.e. the over-the-top (OTT) client 120 delivers a service as available to its' functionality and thereby consumes IP bandwidth as a result of service fulfillment). In particular, as depicted in steps 24a and 24b of FIG. 3, the over-the-top (OTT) application client 120 on the user equipment 108 either initiates or receives a request to begin service fulfillment.

As shown in step 25, once a request for service fulfillment is received (or initiated) on the over-the-top (OTT) application server 110 (via a Gi/SGi interface 310), the over-the-top (OTT) application server 110 attempts to establish a mutually authenticated (client 120 and server 110) transport layer security (TLS)/secure sockets layer (SSL) connection with the quality of service (QoS) server 100 (following standard transport layer security (TLS)/secure sockets layer (SSL) procedures for mutual authentication).

As portrayed in step 26, if the initial mutual authentication step is successful, the over-the-top (OTT) application server 110 sends an application quality of service (QoS) request message over the virtual private network (VPN) tunnel 114 to the quality of service (QoS) server 100, to request that a desired level of quality of service (QoS) treatment be applied to application data routed by the over-the-top (OTT) application over the virtual private network (VPN) tunnel 114.

As depicted in steps 27-33, the quality of service (QoS) server 100 then performs application quality of service (QoS) request message validation on the received application quality of service (QoS) request message, identifies a home mobile network operator (MNO) for the requesting client user equipment (UE) 108, sends appropriate quality of service (QoS) data to a home policy and charging rules function (PCRF) 104 based on the type of virtual private network (VPN) tunnel 114 routing application data, and subsequently forwards a quality of service (QoS) application response message to the over-the-top (OTT) application server 110, as previously described in steps 17-23.

In accordance with the principles of the present invention, once signaling or data services are terminated on the over-the-top (OTT) application client device 108, the over-the-top (OTT) application server 110 informs the quality of service (QoS) server 100 of the service termination, to trigger reserved quality of service (QoS) values to be terminated on the client devices' 108 home mobile network operator (MNO).

In particular, as depicted in step 34 of FIG. 3, when the over-the-top (OTT) application server 110 detects a termination of signaling or service on the over-the-top (OTT) application client user equipment (UE) 108, the over-the-top (OTT) application server 110 attempts to establish a mutually authenticated (client 120 and server 110) TLS/SSL connection with the quality of service (QoS) server 100 (following standard TLS/SSL procedures for mutual authentication).

As portrayed in step 35, if the initial mutual authentication step is successful, the over-the-top (OTT) application server 110 sends an application quality of service (QoS) termination message to the quality of service (QoS) server 100.

In accordance with the principles of the present invention, an application quality of service (QoS) termination message preferably includes: a message ID (an identifier defined by, and unique to, a requesting over-the-top (OTT) application), an application identifier (as described in 3GPP series 29.214 specification), access credentials (e.g. a secret/password public key infrastructure (PKI) verification, etc.), a quality of service (QoS) application profile ID, a source framed IP address (an attribute-value part (AVP)) or framed IPv6 prefix (an attribute-value part (AVP), RFC 4005 [12]), a service uniform resource name (URN) (an attribute-value part (AVP), 3GPP 29.214), a reservation priority (TS 183.017 [15]) (a vendor is preferably set to european telecommunications standards institute (ETSI) (13019) [15]), and a subscription ID (RFC 4006 [14]), identifying a particular subscription, e.g., international mobile subscriber identity (IMSI), mobile station integrated services digital network (MSISDN), etc.

In response to an application quality of service (QoS) termination message, the quality of service (QoS) server 100 performs application quality of service (QoS) termination message validation, as portrayed in step 36. During application quality of service (QoS) termination message validation, the quality of service (QoS) server 100 validates the application identifier and access credentials (e.g., a secret/password public key infrastructure (PKI) verification, etc.) received in the application quality of service (QoS) termination message against application profile data maintained in a local application information database 220.

As depicted in step 37, once application quality of service (QoS) termination message validation is complete, the quality of service (QoS) server 100 sends a diameter session termination request (STR) message to the policy and charging rules function (PCRF) 104 on the over-the-top (OTT) application client device's 108 home mobile network operator (MNO), to indicate that service/signaling has been terminated.

In steps 38 and 39, the policy and charging rules function (PCRF) 104 responds to the quality of service (QoS) server 100 with a diameter session termination answer (STA) message, and the quality of service (QoS) server 100 subsequently sends an application quality of service (QoS) response message (including an appropriate status value) to the requesting over-the-top (OTT) application server 110.

Similarly, the virtual private network (VPN) client 118 and/or server 112 sends an IPSec tunnel mapping table, containing appropriate tunnel termination information (tunneling information depicted in Table 1) to the quality of service (QoS) server 100, once the virtual private network (VPN) tunnel 114 is terminated.

In particular, as depicted in steps 40a, 40b, and 40c, the virtual private network (VPN) client 118/server 112 sends a VPN quality of service (QoS) termination message with appropriate tunneling information (tunneling information depicted in Table 1) to the quality of service (QoS) server 100 when the virtual private network (VPN) tunnel 114 is terminated. The virtual private network (VPN) client 118 sends a VPN quality of service (QoS) termination message to the quality of service (QoS) server 100 via a conventional Gi/SGi interface 310.

In accordance with the principles of the present invention, a VPN quality of service (QoS) termination message preferably includes access credentials and a tunnel source and destination IP address, to enable the quality of service (QoS) server to identify which tunnel is being terminated and to determine if a pending quality of service (QoS) configuration in the wireless network need be removed as a result of the tunnel termination. A quality of service (QoS) termination message is typically preceded by a session termination. However, this may not always be the case.

In step 41, the quality of service (QoS) server 100 receives the VPN quality of service (QoS) termination message and appropriately responds to the virtual private network (VPN) client 118/server 112 with a VPN quality of service (QoS) response message.

Many commercial wireless networks provide quality of service (QoS) to their clients. The inventive solution is described herein via use of a specific long term evolution (LTE) network provider. However, the present invention may be applied to any wireless network that supports quality of service (QoS) treatment, including: a universal mobile telecommunications system (UMTS), long term evolution (LTE) technology, an evolved-universal mobile telecommunications system (E-UMTS), long term evolution (LTE) technology advanced, and Wi-Fi.

Inventive quality of service (QoS) logic may and should be extended to support other scenarios, such as scenarios described as "Application Function" logic in 3GPP series 29 specifications.

Use of this inventive technology causes certain packets associated with a virtual private network (VPN) connection to be identified via their security parameter index (SPI) value. Identification of this nature may reveal an associative characteristic of some virtual private network (VPN) packets. Implementers of the inventive technology may wish to determine if additional security, additional encryption, etc., is required to compensate for the reveal of the associative nature of packets.

The present invention has particular applicability to United States federal agencies, such as the Federal Emergency Management Agency (FEMA), and the Department of Homeland Security (DHS), etc., as well as to emergency first responders, large over-the-top (OTT) application providers (e.g., Google™, Apple™, etc.), and enhanced long term evolution (LTE) policy and charging rules function(s) (PCRF), from policy and charging rules function (PCRF) vendors.

While the invention has been described with reference to the exemplary embodiments thereof, those skilled in the art will be able to make various modifications to the described embodiments of the invention without departing from the true spirit and scope of the invention.

What is claimed is:

1. A method for extending quality of service (QoS) treatment to an over-the-top (OTT) application transmitting data over a commercial wireless network via a virtual private network (VPN) tunnel, comprising:
  receiving an application quality of service (QoS) request message from an over-the-top (OTT) application server;
  performing validation on said quality of service (QoS) request message;
  querying a local mobile network operator (MNO) information database for a home mobile network operator (MNO) assigned to an over-the-top (OTT) application client device;
  determining that said over-the-top (OTT) application is permitted to influence quality of service (QoS) settings on said home mobile network operator (MNO);
  sending a message with appropriate quality of service (QoS) information to a policy and charging rules function (PCRF) on said home mobile network operator (MNO), said policy and charging rules function (PCRF) providing quality of service (QoS) treatment to said over-the-top (OTT) application transmitting data over said virtual private network (VPN) tunnel;
  returning an application quality of service (QoS) response message to said over-the-top (OTT) application server with an appropriate status identifier; and
  querying an external number portability database (NPDB) for home mobile network operator (MNO) information when home mobile network operator (MNO) information is not found in said local mobile network operator (MNO) information database.

2. The method for extending quality of service (QoS) treatment to an over-the-top (OTT) application transmitting data over a commercial wireless network via a virtual private network (VPN) tunnel according to claim 1, wherein:
  said quality of service information is sent to said policy and charging rules function (PCRF) via a diameter protocol interface.

3. The method for extending quality of service (QoS) treatment to an over-the-top (OTT) application transmitting data over a commercial wireless network via a virtual private network (VPN) tunnel according to claim 1, wherein:
  said policy and charging rules function (PCRF) on said home mobile network operator (MNO) forwards received quality of service (QoS) rules to a policy and charging rules function (PCRF) serving said over-the-top (OTT) application client device when said (OTT) application client device is roaming.

4. The method for extending quality of service (QoS) treatment to an over-the-top (OTT) application transmitting data over a commercial wireless network via a virtual private network (VPN) tunnel according to claim 1, wherein:
  said quality of service (QoS) request message indicates a particular quality of service (QoS) profile to invoke.

5. The method for extending quality of service (QoS) treatment to an over-the-top (OTT) application transmitting data over a commercial wireless network via a virtual private network (VPN) tunnel according to claim 1, wherein:
  said over-the-top (OTT) application server sends an application quality of service (QoS) termination message to said quality of service (QoS) server when said over-the-top (OTT) application server detects a termination of service or signaling on said over-the-top (OTT) application client.

6. The method for extending quality of service (QoS) treatment to an over-the-top (OTT) application transmitting data over a commercial wireless network via a virtual private network (VPN) tunnel according to claim 5, wherein:
  said application quality of service (QoS) termination message indicates to said quality of service (QoS) server that reserved quality of service (QoS) values may be terminated on said home mobile network operator (MNO) assigned to said over-the-top (OTT) application client device.

7. A method for extending quality of service (QoS) treatment to an over-the-top (OTT) application transmitting data over a commercial wireless network via a virtual private network (VPN) tunnel, comprising:
  receiving an application quality of service (QoS) request message from an over-the-top (OTT) application server;
  performing validation on said quality of service (QoS) request message;
  querying a local mobile network operator (MNO) information database for a home mobile network operator (MNO) assigned to an over-the-top (OTT) application client device;
  determining that said over-the-top (OTT) application is permitted to influence quality of service (QoS) settings on said home mobile network operator (MNO);
  sending a message with appropriate quality of service (QoS) information to a policy and charging rules function (PCRF) on said home mobile network operator (MNO), said message sent to said policy and charging rules (PCRF) function assigning quality of service (QoS) rules defined in said application quality of service (QoS) request message to all application data routed over said virtual private network (VPN) tunnel when said virtual private network (VPN) tunnel is a single-tenant virtual private network (VPN) tunnel; and
  returning an application quality of service (QoS) response message to said over-the-top (OTT) application server with an appropriate status identifier.

8. The method for extending quality of service (QoS) treatment to an over-the-top (OTT) application transmitting data over a commercial wireless network via a virtual private network (VPN) tunnel according to claim 7, wherein:
  said message sent to said policy and charging rules (PCRF) function assigns quality of service (QoS) rules defined in said application quality of service (QoS) request message to application data routed for said requesting over-the-top (OTT) application when said over-the-top (OTT) application is routing data over a multi-tenant virtual private network (VPN) tunnel.

9. A method for extending quality of service (QoS) treatment to an over-the-top (OTT) application transmitting data over a commercial wireless network via a single-tenant virtual private network (VPN) tunnel, comprising:
  receiving a VPN quality of service (QoS) registration or both registration and request messages;
  performing validation on said VPN quality of service (QoS) registration and request messages;
  querying a local mobile network operator (MNO) information database for a home mobile network operator (MNO) assigned to a requesting VPN client device;
  determining that an over-the-top (OTT) application routing data over a single-tenant virtual private network (VPN) tunnel is permitted to influence quality of service (QoS) settings on said home mobile network operator (MNO);

sending a message with appropriate quality of service (QoS) information to a policy and charging rules function (PCRF) on said home mobile network operator (MNO); and returning a VPN quality of service (QoS) response message to a VPN client/server with an appropriate status identifier.

10. The method for extending quality of service (QoS) treatment to an over-the-top (OTT) application transmitting data over a commercial wireless network via a single-tenant virtual private network (VPN) tunnel according to claim 9, wherein:

said quality of service (QoS) server applies quality of service (QoS) rules received in said VPN quality of service (QoS) request message to all application data routed over said single-tenant virtual private network (VPN) tunnel.

11. The method for extending quality of service (QoS) treatment to an over-the-top (OTT) application transmitting data over a commercial wireless network via a single-tenant virtual private network (VPN) tunnel according to claim 9, wherein:

an external number portability database (NPDB) is queried for home mobile network operator (MNO) information when home mobile network operator (MNO) information cannot be found in said local mobile network operator (MNO) information database.

12. The method for extending quality of service (QoS) treatment to an over-the-top (OTT) application transmitting data over a commercial wireless network via a single-tenant virtual private network (VPN) tunnel according to claim 9, wherein:

said quality of service information is sent to said policy and charging rules function (PCRF) via a diameter protocol interface.

13. The method for extending quality of service (QoS) treatment to an over-the-top (OTT) application transmitting data over a commercial wireless network via a single-tenant virtual private network (VPN) tunnel according to claim 9, wherein:

said policy and charging rules function (PCRF) on said home mobile network operator (MNO) forwards received quality of service (QoS) rules to a policy and charging rules function (PCRF) serving said VPN client device when said VPN client device is roaming.

14. The method for extending quality of service (QoS) treatment to an over-the-top (OTT) application transmitting data over a commercial wireless network via a single-tenant virtual private network (VPN) tunnel according to claim 9, wherein:

said VPN quality of service (QoS) request message indicates a particular quality of service (QoS) profile to invoke.

15. A quality of service (QoS) server for extending quality of service (QoS) treatment to an over-the-top (OTT) application transmitting data over a commercial wireless network via a virtual private network (VPN) tunnel, comprising:

an over-the-top (OTT) application interface for interfacing with an over-the-top (OTT) application server;

a mobile network operator (MNO) policy and charging rules function (PCRF) interface for interfacing with a policy and charging rules function (PCRF) on a home mobile network operator (MNO) assigned to an over-the-top (OTT) application client device;

a number portability database (NPDB) interface for interfacing with an external number portability database (NPDB);

a virtual private network (VPN) client/server interface for interfacing with a virtual private network client/server at either end of a virtual private network (VPN) tunnel routing data to/from said over-the-top (OTT) application server;

a local virtual private network (VPN) tunneling information database to store information for supported virtual private networks (VPN);

a local application information database to store a profile for a supported over-the-top (OTT) application; and a local mobile network operator (MNO) information database to store home mobile network operator (MNO) information for supported over-the-top (OTT) application clients.

16. The quality of service (QoS) server for extending quality of service (QoS) treatment to an over-the-top (OTT) application transmitting data over a commercial wireless network via a virtual private network tunnel according to claim 15, wherein:

said mobile network operator (MNO) policy and charging rules function (PCRF) interface is a diameter protocol interface.

17. The quality of service (QoS) server for extending quality of service (QoS) treatment to an over-the-top (OTT) application transmitting data over a commercial wireless network via a virtual private network tunnel according to claim 15, wherein:

said virtual private network (VPN) client/server interface is a secure transport layer security (TLS)/secure sockets layer (SSL) communications channel.

18. The quality of service (QoS) server for extending quality of service (QoS) treatment to an over-the-top (OTT) application transmitting data over a commercial wireless network via a virtual private network tunnel according to claim 15, wherein:

said over-the-top (OTT) application interface is a secure transport layer security (TLS)/secure sockets layer (SSL) communications channel.

19. The quality of service (QoS) server for extending quality of service (QoS) treatment to an over-the-top (OTT) application on a commercial wireless network according to claim 15, wherein:

said quality of service (QoS) server translates received diameter protocol messages to other communication mediums and vice versa.

20. The quality of service (QoS) server for extending quality of service (QoS) treatment to an over-the-top (OTT) application transmitting data over a commercial wireless network via a virtual private network tunnel according to claim 15, wherein:

said over-the-top (OTT) application server requests and gets desired quality of service (QoS) treatment from said quality of service (QoS) server for application data routed over said virtual private network (VPN) tunnel.

21. The quality of service (QoS) server for extending quality of service (QoS) treatment to an over-the-top (OTT) application transmitting data over a commercial wireless network via a virtual private network tunnel according to claim 15, wherein:

said virtual private network client/server requests and gets desired quality of service (QoS) treatment from said quality of service (QoS) server for application data routed over said virtual private network (VPN) tunnel.

22. The quality of service (QoS) server for extending quality of service (QoS) treatment to an over-the-top (OTT) application transmitting data over a commercial wireless network via a virtual private network tunnel according to claim 15, wherein:

said commercial wireless network is a long term evolution (LTE) network.

23. The quality of service (QoS) server for extending quality of service (QoS) treatment to an over-the-top (OTT) application transmitting data over a commercial wireless network via a virtual private network tunnel according to claim 15, wherein:

said commercial wireless network is a universal mobile telecommunications system (UMTS) network.

24. The quality of service (QoS) server for extending quality of service (QoS) treatment to an over-the-top (OTT) application transmitting data over a commercial wireless network via a virtual private network tunnel according to claim 15, wherein:

said commercial wireless network is a Wi-Fi network.

25. The quality of service (QoS) server for extending quality of service (QoS) treatment to an over-the-top (OTT) application transmitting data over a commercial wireless network via a virtual private network tunnel according to claim 15, wherein:

said virtual private network (VPN) tunnel is an IPSec virtual private network (VPN) tunnel.

26. The quality of service (QoS) server for extending quality of service (QoS) treatment to an over-the-top (OTT) application transmitting data over a commercial wireless network via a virtual private network tunnel according to claim 15, wherein:

said virtual private network (VPN) tunnel is a layer 2 tunneling protocol (L2TP) virtual private network (VPN) tunnel.

27. The quality of service (QoS) server for extending quality of service (QoS) treatment to an over-the-top (OTT) application transmitting data over a commercial wireless network via a virtual private network tunnel according to claim 15, wherein:

said virtual private network (VPN) tunnel is point-to-point tunneling protocol (PPTP) virtual private network (VPN) tunnel.

28. The quality of service (QoS) server for extending quality of service (QoS) treatment to an over-the-top (OTT) application transmitting data over a commercial wireless network via a virtual private network tunnel according to claim 15, wherein:

said virtual private network (VPN) tunnel is a transport layer security (TLS) virtual private network (VPN) tunnel.

29. The quality of service (QoS) server for extending quality of service (QoS) treatment to an over-the-top (OTT) application transmitting data over a commercial wireless network via a virtual private network tunnel according to claim 15, wherein:

said virtual private network (VPN) tunnel is a multi-tenant virtual private network (VPN) tunnel.

30. The quality of service (QoS) server for extending quality of service (QoS) treatment to an over-the-top (OTT) application transmitting data over a commercial wireless network via a virtual private network tunnel according to claim 15, wherein:

said virtual private network (VPN) tunnel is a single-tenant virtual private network (VPN) tunnel.

31. The quality of service (QoS) server for extending quality of service (QoS) treatment to an over-the-top (OTT) application transmitting data over a commercial wireless network via a virtual private network tunnel according to claim 15, wherein:

a single-tenant virtual private network (VPN) tunnel must provision identification details and one or more quality of service (QoS) application profiles on said quality of service (QoS) server before said single-tenant virtual private network (VPN) tunnel may request quality of service (QoS) treatment therefrom.

32. The quality of service (QoS) server for extending quality of service (QoS) treatment to an over-the-top (OTT) application transmitting data over a commercial wireless network via a virtual private network tunnel according to claim 15, wherein:

a multi-tenant virtual private network (VPN) tunnel must provision identification details and adequate tunneling information on said quality of service (QoS) server before said multi-tenant virtual private network (VPN) tunnel may request quality of service (QoS) treatment therefrom.

33. The quality of service (QoS) server for extending quality of service (QoS) treatment to an over-the-top (OTT) application transmitting data over a commercial wireless network via a virtual private network tunnel according to claim 32, wherein:

said adequate tunneling information enables said quality of service (QoS) server to determine actual IP header information associated with data routed over said multi-tenant virtual private network (VPN) tunnel.

34. The quality of service (QoS) server for extending quality of service (QoS) treatment to an over-the-top (OTT) application transmitting data over a commercial wireless network via a virtual private network tunnel according to claim 15, wherein:

said quality of service (QoS) application profile indicates a desired level of quality of service (QoS).

35. The quality of service (QoS) server for extending quality of service (QoS) treatment to an over-the-top (OTT) application transmitting data over a commercial wireless network via a virtual private network tunnel according to claim 15, wherein:

said over-the-top (OTT) application server sends an application quality of service (QoS) request message to said quality of service (QoS) server to request quality of service (QoS) treatment therefrom.

36. The quality of service (QoS) server for extending quality of service (QoS) treatment to an over-the-top (OTT) application transmitting data over a commercial wireless network via a virtual private network tunnel according to claim 35, wherein:

said application quality of service (QoS) request message must indicate desired quality of service (QoS) rules.

37. The quality of service (QoS) server for extending quality of service (QoS) treatment to an over-the-top (OTT) application transmitting data over a commercial wireless network via a virtual private network tunnel according to claim 15, wherein:

said virtual private network client/server sends a VPN quality of service (QoS) request message to said quality of service (QoS) server to request quality of service (QoS) treatment therefrom.

38. The quality of service (QoS) server for extending quality of service (QoS) treatment to an over-the-top (OTT) application transmitting data over a commercial wireless network via a virtual private network tunnel according to claim 36, wherein:

said quality of service (QoS) server forwards desired quality of service (QoS) rules embedded in said quality of service (QoS) request message to a policy and charging rules function (PCRF) on a home mobile network operator (MNO) assigned to said requesting client device.

39. The quality of service (QoS) server for extending quality of service (QoS) treatment to an over-the-top (OTT) application transmitting data over a commercial wireless network via a virtual private network tunnel according to claim 15, wherein:
said quality of service (QoS) server queries said local mobile network operator (MNO) database to determine a home mobile network operator (MNO) for said requesting client device.

40. The quality of service (QoS) server for extending quality of service (QoS) treatment to an over-the-top (OTT) application transmitting data over a commercial wireless network via a virtual private network tunnel according to claim 15, wherein:
said quality of service (QoS) server queries said external number portability database (NPDB) to determine a home mobile network operator (MNO) for said requesting client device when home mobile network operator (MNO) information is not found in said local mobile network operator (MNO) database.

41. The quality of service (QoS) server for extending quality of service (QoS) treatment to an over-the-top (OTT) application transmitting data over a commercial wireless network via a virtual private network tunnel according to claim 15, wherein:
said home policy and charging rules function (PCRF) provides conventional quality of service (QoS) treatment to said over-the-top (OTT) application transmitting data over said virtual private network (VPN) tunnel.

42. The quality of service (QoS) server for extending quality of service (QoS) treatment to an over-the-top (OTT) application transmitting data over a commercial wireless network via a virtual private network tunnel according to claim 41, wherein:
said policy and charging rules function (PCRF) on said home mobile network operator (MNO) forwards desired quality of service (QoS) rules to a policy and charging rules function (PCRF) on a visiting mobile network operator (MNO) when said requesting client device is roaming.

43. The quality of service (QoS) server for extending quality of service (QoS) treatment to an over-the-top (OTT) application transmitting data over a commercial wireless network via a virtual private network tunnel according to claim 15, wherein:
said over-the-top (OTT) application server sends an application quality of service (QoS) termination message to said quality of service (QoS) server when said over-the-top (OTT) application server detects a termination of service on said over-the-top (OTT) application client.

44. The quality of service (QoS) server for extending quality of service (QoS) treatment to an over-the-top (OTT) application transmitting data over a commercial wireless network via a virtual private network tunnel according to claim 43, wherein:
said application quality of service (QoS) termination message indicates that reserved quality of service (QoS) values may be terminated on said home mobile network operator (MNO).

45. The quality of service (QoS) server for extending quality of service (QoS) treatment to an over-the-top (OTT) application transmitting data over a commercial wireless network via a virtual private network tunnel according to claim 15, wherein:
said virtual private network (VPN) client/server sends a virtual private network (VPN) quality of service (QoS) termination message to said quality of service (QoS) server when a virtual private network (VPN) tunnel is terminated.

* * * * *